(12) United States Patent
Fujioka et al.

(10) Patent No.: US 12,186,955 B2
(45) Date of Patent: Jan. 7, 2025

(54) INJECTION DEVICE AND MOLDING MACHINE

(71) Applicant: Shibaura Machine Co., Ltd., Tokyo (JP)

(72) Inventors: Toshiharu Fujioka, Isehara (JP); Kazuma Hayase, Yokohama (JP); Hiroshi Yokoyama, Ebina (JP); Makoto Tsuji, Yamato (JP); Saburo Noda, Atsugi (JP)

(73) Assignee: Shibaura Machine Co., Ltd., Tokyo (JP)

( * ) Notice: Subject to any disclaimer, the term of this patent is extended or adjusted under 35 U.S.C. 154(b) by 532 days.

(21) Appl. No.: 17/436,477

(22) PCT Filed: Dec. 27, 2019

(86) PCT No.: PCT/JP2019/051422
§ 371 (c)(1),
(2) Date: Sep. 3, 2021

(87) PCT Pub. No.: WO2020/179209
PCT Pub. Date: Sep. 10, 2020

(65) Prior Publication Data
US 2022/0168937 A1 Jun. 2, 2022

(30) Foreign Application Priority Data

Mar. 4, 2019 (JP) .................................. 2019-038623

(51) Int. Cl.
*B29C 45/67* (2006.01)
*B29C 45/53* (2006.01)

(52) U.S. Cl.
CPC ............ *B29C 45/531* (2013.01); *B29C 45/67* (2013.01)

(58) Field of Classification Search
CPC . B29C 45/67; B29C 45/6728; B29C 45/7653; B29C 2945/76548; B29C 2945/76593; B29C 2945/76869
See application file for complete search history.

(56) References Cited

U.S. PATENT DOCUMENTS

| 4,066,189 A * | 1/1978 | Toyoaki | .................. B29C 45/46 |
| | | | 425/146 |
| 2015/0273750 A1* | 10/2015 | Ikarashi | .............. B29C 45/6728 |
| | | | 264/40.5 |
| 2018/0290207 A1 | 10/2018 | Yokoyama | |

FOREIGN PATENT DOCUMENTS

| CN | 108688111 | 10/2018 |
| JP | S63-154253 | 6/1988 |

(Continued)

OTHER PUBLICATIONS

Chinese Office Action in Application No. 201980093610.1, dated Sep. 15, 2022.

(Continued)

*Primary Examiner* — Thu Khanh T. Nguyen
(74) *Attorney, Agent, or Firm* — DLA PIPER LLP (US)

(57) ABSTRACT

A run-around circuit makes a hydraulic fluid discharged from a rod-side chamber along with a forward movement of a piston in an injection cylinder flow into a head-side chamber. A servo valve is provided in the run-around circuit and is connected to a tank. In a first state, the servo valve permits flow from the rod-side chamber to the head-side chamber, while prohibits flow from the rod-side chamber to the tank. In a second state, the servo valve prohibits flow from the rod-side chamber to the head-side chamber, while permits flow from the rod-side chamber to the tank. The servo valve can control the flow rate of the hydraulic fluid discharged from the rod-side chamber in each of the first state and second state.

11 Claims, 8 Drawing Sheets

(56) References Cited

FOREIGN PATENT DOCUMENTS

| | | |
|---|---|---|
| JP | H10-052747 | 2/1998 |
| JP | H10-52748 | 2/1998 |
| JP | H10-080760 | 3/1998 |
| JP | H10-249510 | 9/1998 |
| JP | 2004-276071 | 10/2004 |
| JP | 2011-224626 | 11/2011 |
| JP | 2013-018011 | 1/2013 |
| WO | WO 1995/030094 | 9/1995 |

OTHER PUBLICATIONS

International Search Report dated Feb. 10, 2020 issued in PCT/JP2019/051422.
Written Opinion dated Feb. 10, 2020 issued in PCT/JP2019/051422.

* cited by examiner

FIG. 7

| | OPERATION | SERVO VALVE | ACC-USE VALVE | CONTROL VALVE | SWITCH VALVE |
|---|---|---|---|---|---|
| 1 | PREPARATION | C | — | — | P→R |
| 2 | LOW-SPEED | R→H | P | — | C |
| 3 | HIGH-SPEED | R→H | P | — | C |
| 4 | DECELERATION | R→H | P | — | C |
| 5 | PRESSURE INCREASING | R→T | P | — | C |
| 6 | PRESSURE HOLDING | C | P | — | C (P→RorH) |
| 7 | RETRACTION | C | — | P | P→R |
| 8 | FORWARD MOVEMENT | R→T | — | — | P→H |

INJECTION DEVICE AND MOLDING MACHINE

CROSS REFERENCE TO RELATED APPLICATIONS

This application is a U.S. National Stage Application of International Application No. PCT/JP2019/051422 filed Dec. 27, 2019, which claims priority from Japanese Patent Application No. 2019-038623 filed Mar. 4, 2019. The entirety of all the above-listed applications are incorporated herein by reference.

TECHNICAL FIELD

The present disclosure relates to an injection device and a molding machine. The molding machine is, for example, a die casting machine or an injection molding machine.

BACKGROUND ART

Known in the art is an injection device driving a plunger ejecting a molding material into a mold by an injection cylinder (hydraulic cylinder) (for example Patent Literatures 1 to 7). The injection cylinder has a cylinder part, a piston accommodated in the cylinder part, and a piston rod which is fixed to the piston and extends outward to the outside of the cylinder part. Further, the front end of the piston rod is connected to the rear end of the plunger. The inside of the cylinder part is partitioned by the piston into a rod-side chamber at a side where the piston rod extends outward and a head-side chamber at an opposite side to the former. By feed of a hydraulic fluid to the head-side chamber, the piston moves forward and in turn the plunger moves forward. Further, by feed of the hydraulic fluid to the rod-side chamber, the piston moves backward and in turn the plunger moves backward.

The rod-side chamber is connected through a directional control valve or another valve with a tank. By communication of the rod-side chamber and the tank, for example, the hydraulic fluid discharged from the rod-side chamber along with the forward movement of the piston is stored in the tank. Further, by cut-off of the rod-side chamber and the tank, for example, wasteful discharge of the hydraulic fluid to the tank no longer occurs when the hydraulic fluid is fed to the rod-side chamber for the backward movement of the piston.

The rod-side chamber is sometimes connected through a so-called "run-around" circuit to the head-side chamber. By communication between the rod-side chamber and the head-side chamber through the run-around circuit, the hydraulic fluid discharged from the rod-side chamber along with the forward movement of the piston is fed to the head-side chamber, therefore the hydraulic fluid required for the forward movement of the piston can be reduced. The run-around circuit is provided with a directional control valve or another valve.

Communication and cut-off (ON and OFF of the run-around circuit) between the rod-side chamber and the head-side chamber are carried out by the control of the above valve.

Communication between the rod-side chamber and the tank and communication between the rod-side chamber and the head-side chamber (ON of the run-around circuit) are selectively carried out. For example, in a low-speed injection process and high-speed injection process of moving the plunger forward and ejecting the molding material into the mold, the rod-side chamber and the tank are cut off from each other, and the run-around circuit is rendered ON. Due to this, for example, an effect of reduction of the hydraulic fluid explained above is obtained. Further, in a pressure-raising process of raising the pressure which is imparted to the molding material in the mold by the plunger (injection pressure), the rod-side chamber and the tank are communicated, and the run-around circuit is rendered OFF. Due to this, for example, the pressure in the rod-side chamber can be made sufficiently low to make the pressure which is imparted from the plunger to the molding material larger.

Patent Literature 2 points out an inconvenience due to the communication and cut-off between the rod-side chamber and the tank and the ON/OFF switching of the run-around circuit being carried out by different valves. Further, Patent Literature 2 proposes the communication and cut-off between the rod-side chamber and the tank and ON/OFF switching of the run-around circuit being carried out by one directional control valve.

In the control of the speed of the injection cylinder, a so-called "meter-out" circuit and/or "meter-in" circuit is utilized. The meter-out circuit controls the flow rate of the hydraulic fluid discharged from the rod-side chamber along with the forward movement of the piston by a flow control valve (for example servo valve). The meter-in circuit controls the flow rate of the hydraulic fluid fed to the head-side chamber by a flow control valve (for example servo valve).

CITATION LIST

Patent Literature

Patent Literature 1: Japanese Patent Publication No. H10-052747

Patent Literature 2: Japanese Patent Publication No. H10-052748

Patent Literature 3: Japanese Patent Publication No. H10-080760

Patent Literature 4: Japanese Patent Publication No. H10-249510

Patent Literature 5: Japanese Patent Publication No. S63-154253

Patent Literature 6: Japanese Patent Publication No. 2004-276071

Patent Literature 7: International Patent Publication No. 95/30094

SUMMARY OF INVENTION

Technical Problem

The communication and cut-off between the rod-side chamber and the tank, ON/OFF switching of the run-around circuit, and the control of the flow rate of the hydraulic fluid discharged from the rod-side chamber are closely related to each other. However, it is difficult to say that realization of these by a simpler configuration and more effective operations of these have ever been sufficiently studied. Accordingly, it is desired to provide an injection device and molding machine suitably performing control of the flow of the hydraulic fluid for these.

Solution to Problem

An injection device according to one aspect of the present disclosure includes an injection cylinder which drives a plunger for ejecting a molding material into a mold, a run-around circuit which makes a hydraulic fluid discharged from a rod-side chamber in the injection cylinder along with a forward movement of a piston in the injection cylinder flow into a head-side chamber in the injection cylinder, a tank which receives the hydraulic fluid discharged from the rod-side chamber along with the forward movement of the piston, and a servo valve which is provided in the run-around circuit and is connected to the tank. The servo valve can be switched between a first state where flow from the rod-side chamber to the head-side chamber is permitted while flow from the rod-side chamber to the tank is prohibited and a second state where flow from the rod-side chamber to the head-side chamber is prohibited while flow from the rod-side chamber to the tank is permitted, and can control the flow rate of the hydraulic fluid discharged from the rod-side chamber in each of the first state and the second state.

In one example, the servo valve can be switched among the first state, the second state, and a third state where all of flows from the rod-side chamber to the head-side chamber and the tank are prohibited.

In one example, the servo valve includes a hollow valve body and a valve element able to move inside the valve body. The valve body includes a rod-side port communicated with the rod-side chamber, a head-side port communicated with the head-side chamber, and a tank-side port communicated with the tank. The valve element can move between a position where the rod-side port and the head-side port are communicated with each other and where the rod-side port and the tank-side port are cut off from each other and a position where the rod-side port and the head-side port are cut off from each other and where the rod-side port and the tank-side port are communicated with each other.

In one example, the servo valve is a spool valve including a valve sleeve as the valve body in which the rod-side port, the head-side port, and the tank-side port are open at an inner circumferential surface around the axis and including a spool as the valve element which slides in the valve sleeve in an axial direction. The head-side port is positioned on one side in the axial direction relative to the rod-side port. The tank-side port is positioned on the other side in the axial direction relative to the rod-side port. The spool includes a large diameter portion having a diameter sliding relative to the valve sleeve and able to close the entirety of the rod-side port, a head-side small diameter portion which is positioned on the one side relative to the large diameter portion, has a smaller diameter than the large diameter portion, and is able to make the rod-side port and the head-side port communicate by facing the two, and a tank-side small diameter portion which is positioned on the other side relative to the large diameter portion, has a smaller diameter than the large diameter portion, and is able to make the rod-side port and the tank-side port communicate by facing the two.

In one example, the injection device further includes a check valve which is positioned inside the run-around circuit between the head-side chamber and the servo valve, prohibits flow from the head-side chamber to the servo valve, and permits flow from the servo valve to the head-side chamber.

In one example, the injection device further includes an injection control part which controls the servo valve so as to become the first state at least during a period of a low-speed injection process and a high-speed injection process, and a pressure increase control part which controls the servo valve so as to become the second state at least during a period of a pressure increasing process.

In one example, the injection device includes a liquid pressure supply part including a liquid pressure source, and a pressure holding control part which controls the liquid pressure supply part so as to temporarily give liquid pressure from the liquid pressure source to the rod-side chamber during a period of a pressure holding process.

In one example, the injection device includes an accumulator, an accumulator-use valve ("ACC-use valve") which controls flow of the hydraulic fluid from the accumulator to the head-side chamber, a liquid pressure supply part including a liquid pressure source, and a pressure holding control part which controls the ACC-use valve so that liquid pressure is continuously imparted from the accumulator to the head-side chamber during a period of a pressure holding process and controls the liquid pressure supply part so as to temporarily give liquid pressure from the liquid pressure source to the head-side chamber during the period of the pressure holding process.

In one example, the injection device has an accumulator, an ACC-use valve which controls the flow of the hydraulic fluid from the accumulator to the head-side chamber, a liquid pressure supply part including a liquid pressure source, a pressure increasing control part which controls the ACC-use valve so that the liquid pressure is imparted from the accumulator to the head-side chamber during a period of a pressure increasing process, and a pressure holding control part which controls the liquid pressure supply part so that the liquid pressure is continuously imparted from the liquid pressure source to the head-side chamber at least after a predetermined point of time in a period of a pressure holding process.

In one example, the injection device further includes a preparation control part which controls the liquid pressure supply part so that liquid pressure is imparted from the liquid pressure source to the rod-side chamber before the start of injection to thereby make a pressure in the rod-side chamber at the time of start of injection higher than a pressure in the tank.

A molding machine according to the present disclosure includes the above injection device, a clamping device which clamps the mold, and an ejection device which ejects a molding product from the mold.

Advantageous Effect of Invention

According to the above configurations, the flow of the hydraulic fluid relating to the injection cylinder can be suitably controlled.

BRIEF DESCRIPTION OF DRAWINGS

FIG. 7 is a time table showing operations of a plurality of valves in a casting cycle according to the embodiment.

DESCRIPTION OF EMBODIMENTS (Overall Configuration of Die Casting Machine)

Figure 1:
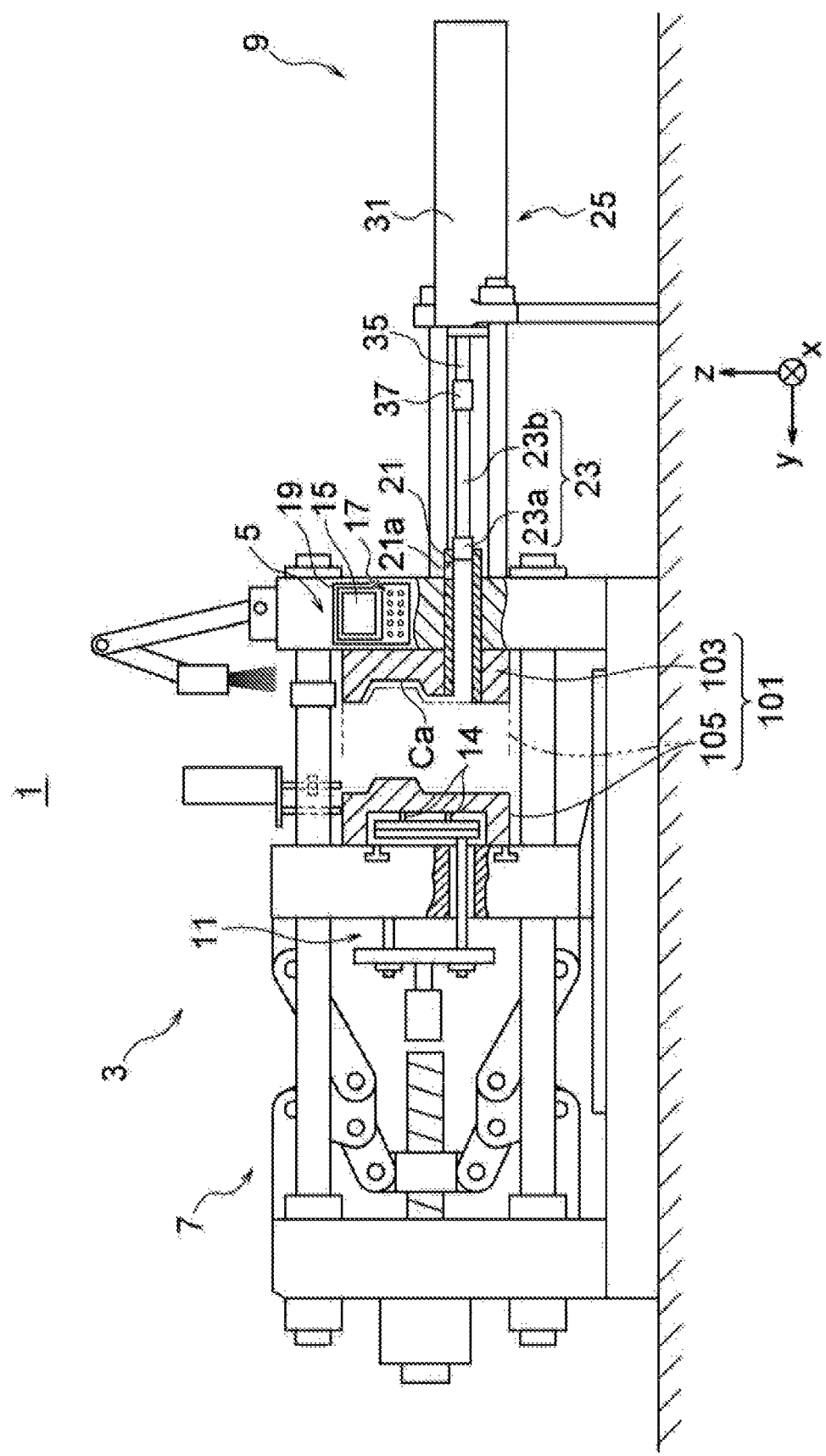
FIG. 1 is a schematic view showing the configuration of a die casting machine having an injection device according to an embodiment of the present disclosure.

FIG. 1 is a side surface view showing the configuration of a principal part of a die casting machine 1 according to an embodiment of the present disclosure and including a cross-sectional view in part. Note that, an up-down direction in the drawing sheet is a vertical direction, and a right-left direction in the drawing sheet and a direction running through the drawing sheet are horizontal directions.

The die casting machine 1 injects a metal material in an unhardened state to an inside (cavity Ca or another space, the same is true for the following explanation) of die 101 and makes the metal material solidify in the die 101 to thereby manufacture a die casting product (molding product). The unhardened state is, for example, a liquid state or solid-liquid coexisting state. The solid-liquid coexisting state is a semi-solidified state where solidification advances from the liquid state or a semi-molten state where melting advances from the solid state. The metal is, for example, aluminum or an aluminum alloy. Note that, in the following explanation, as the unhardened metal material, basically a molten metal (liquid state metal material) will be taken as an example.

The die 101, for example, include a fixed die 103 and a movable die 105. In the explanation of the present embodiment, for convenience, the cross-section of the fixed die 103 or movable die 105 is indicated by one type of hatching. However, these dies may be directly cut ones or may be nesting type ones. Further, cores or the like may be combined with the fixed die 103 and movable die 105 as well.

The die casting machine 1, for example, has a machine body 3 performing mechanical operations for molding and a control unit 5 which controls the operation of the machine body 3.

The machine body 3 has a clamping device 7 which performs opening/closing and clamping of the die 101, an injection device 9 which injects a molten metal into the die 101, and an ejection device 11 which ejects a die casting product from the fixed die 103 or movable die 105 (movable die 105 in FIG. 1). In the machine body 3, the configurations other than the injection device 9 (for example configurations of the clamping device 7 and ejection device 11) may be made the same as various known configurations.

In the casting cycle, the clamping device 7 makes the movable die 105 move toward the fixed die 103 to thereby close the dies. Further, the clamping device 7 gives a clamping force in accordance with an amount of extension of the tie bars (notation is omitted) to the die 101 to thereby perform clamping. In the clamped die 101, a cavity Ca having the same shape as the molding product is configured. The injection device 9 injects and fills the molten metal into that cavity Ca. The molten metal filled in the cavity Ca is robbed of heat by the die 101 to be cooled and solidifies. Due to this, the molding product is formed. After that, the clamping device 7 makes the movable die 105 move in a direction separating from the fixed die 103 to thereby open the dies. At this time or after that, the ejection device 11 ejects the molding product from the movable die 105.

The control unit 5, for example, has a control device 13 (see FIG. 4) which performs various processing to output control commands, an input device 17 which receives input operations by an operator, and a display device 15 which displays an image. Further, from another viewpoint, the control unit 5, for example, has a not shown control panel having a power feed circuit and control circuit etc. and has an operation part 19 as a user interface.

The control device 13 is, for example, provided in the not shown control panel and operation part 19. The control device 13 may be configured in a suitably divided or dispersed manner. For example, the control device 13 may be configured including lower control devices for the clamping device 7, injection device 9 and ejection device 11, and a higher control device which performs control in order to synchronize these lower control devices.

The display device 15 and input device 17 are, for example, provided in the operation part 19. The operation part 19 is provided in the fixed die plate (notation is omitted) in the clamping device 7 in the example shown. The display device 15 is, for example, configured by a touch panel including a liquid crystal display or organic EL display. The input device 17 is, for example, configured by mechanical switches and the above touch panel.

(Overall Configuration of Injection Device)

The injection device 9, for example, has an injection sleeve 21 communicated with the interior of the die 101, a plunger 23 able to slide in the injection sleeve 21, and an injection driving part 25 which drives the plunger 23. Note that, in the explanation of the injection device 9, sometimes the die 101 side will be referred to as the "front side", and the opposite side to that will be referred to as the "rear side".

The injection sleeve 21 is, for example, a tubular member which is connected to the fixed die 103 and in whose upper surface a feed port 21*a* for feeding the molten metal into the injection sleeve 21 is formed. The plunger 23, for example, has a plunger tip 23*a* able to slide inside the injection sleeve 21 in the forward and backward direction and a plunger rod 23*b* which is fixed at its front end to the plunger tip.

When the clamping of the die 101 by the clamping device 7 is completed, one shot's worth of the molten metal is poured from the feed port 21*a* into the injection sleeve 21 by a not shown molten metal feed device. Further, the plunger 23 slides forward in the injection sleeve 21 from the shown position, whereby the molten metal in the injection sleeve 21 is ejected (injected) into the die 101.

(Injection Driving Part)

Figure 2:
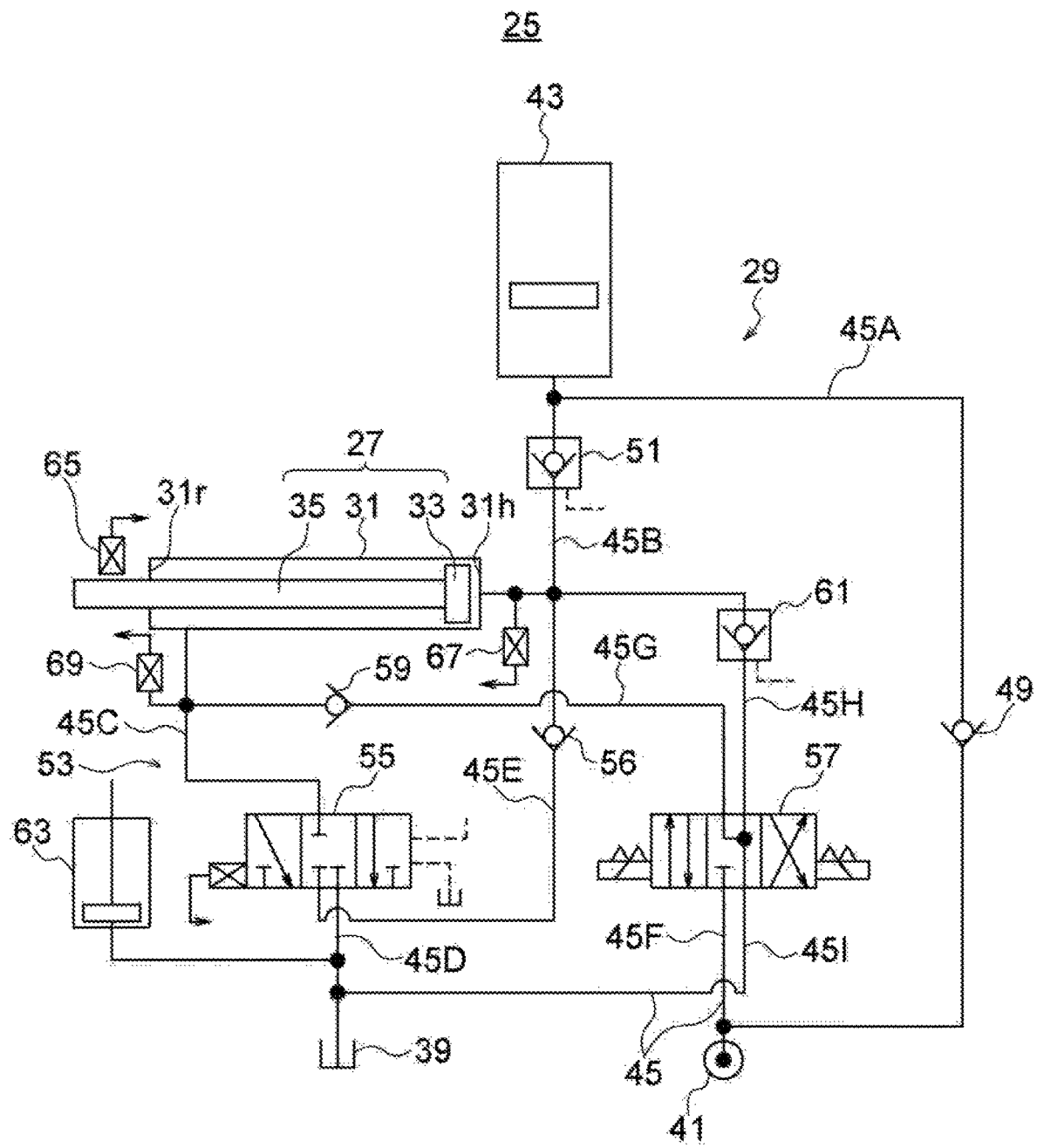
FIG. 2 is a schematic view showing the configuration of an injection driving part in the injection device according to the embodiment.

FIG. 2 is a schematic view showing the configuration of an injection driving part 25 in the injection device 9.

The injection driving part 25 is, for example, made a liquid pressure type one and has an injection cylinder 27 which drives the plunger 23 and a liquid pressure device 29 which feeds the hydraulic fluid (for example oil) to the injection cylinder 27 etc.

(Injection Cylinder)

The injection cylinder 27 is, for example, configured by a so-called single-barrel shaped liquid pressure cylinder. Specifically, for example, the injection cylinder 27 has a cylinder part 31, a piston 33 slidable inside the cylinder part 31, and a piston rod 35 which is fixed to the piston 33 and extends outward from the cylinder part 31.

The cylinder part 31 is, for example, a tubular body with a substantially circular cross-sectional shape at the inside. The inside of the cylinder part 31 is partitioned by the piston 33 into a rod-side chamber 31*r* on a side where the piston rod 35 extends outward and a head-side chamber 31h on the opposite side to the former. By the hydraulic fluid being selectively fed to the head-side chamber 31h and the rod-side chamber 31r, the piston 33 slides in the front-back direction in the cylinder part 31.

The injection cylinder 27 is coaxially arranged with respect to the plunger 23. Further, as shown in FIG. 1, the front end of the piston rod 35 is connected to the rear end of the plunger 23 through a coupling (notation is omitted). The cylinder part 31 is provided in a fixed manner with respect to a nonmovable portion in the die casting machine 1 (for example fixed die plate in the clamping device 7) and the like. Accordingly, by movement of the piston 33 relative to the cylinder part 31, the plunger 23 moves forward or backward in the injection sleeve 21.

(Liquid Pressure Device)

Returning to FIG. 2, the liquid pressure device 29, for example, has a tank 39 storing the hydraulic fluid, a pump 41 (liquid pressure source) which sends out the hydraulic fluid, and an accumulator 43 (liquid pressure source) which stores a high pressure hydraulic fluid. The tank 39, pump 41, accumulator 43, and injection cylinder 27 are connected by a plurality of flow channels 45A to 45I (below, sometimes A to I will be omitted). The flow of the hydraulic fluid in the plurality of flow channels is controlled by a plurality of valves (49, 51, 55, 57, 59, and 61).

Note that, in FIG. 2, for convenience for illustration, the tank 39 and the pump 41 are shown separated. However, the pump 41 may send out the hydraulic fluid stored in the tank 39. Further, for convenience of illustration, the tank 39 is shown at two positions (notation is omitted for one). However, in actuality, the tanks 39 may be combined into one.

(Tank, Pump, and Accumulator)

The tank 39 is, for example, an atmospheric reservoir and holds the hydraulic fluid at atmospheric pressure. The pressure of the hydraulic fluid in the tank 39 will be referred to a "tank pressure". In the atmospheric reservoir, the pressure of the hydraulic fluid is approximately equal to the atmospheric pressure (if influence of the dead weight of the hydraulic fluid is ignored). When the rod-side chamber 31r or head-side chamber 31h is connected with the tank 39, the pressure of the hydraulic fluid in the rod-side chamber 31r or head-side chamber 31h basically becomes the tank pressure.

The pump 41 is driven by an electric motor 47 (see FIG. 4) and sends out the hydraulic fluid. The pump may be made a rotary pump, plunger pump, fixed displacement pump, variable displacement pump, monodirectional pump, bidirectional (2 directions) pump, or another suitable type one. Also, the electric motor driving the pump 41 may be made a DC motor, AC motor, induction motor, synchronous motor, servo motor, or another suitable type one. The pump 41 (electric motor) may be driven all the time during operation of the die casting machine 1 or may be driven according to need.

The accumulator 43 may be made a suitable type one. For example, it may be a weight-loaded type, spring-loaded type, gas-loaded type (including air-loaded type), cylinder type, or bladder type. In the example shown, the accumulator 43 is a cylinder type one. Although not particularly indicated by a notation, it has a cylinder part and a piston which partitions the cylinder part into a liquid chamber and a gas chamber. In the accumulator 43, the pressure is accumulated by feed of the hydraulic fluid to the liquid chamber. The pressure-accumulated relatively high pressure hydraulic fluid can be released to the injection cylinder 27.

(Flow Channels and Valves)

The plurality of flow channels 45 may be configured by pipes, hoses, and/or other members (for example a block-shaped member having through holes formed therein). Further, the plurality of flow channels 45, which will be explained later, may be partially shared with each other. The connection relationships of the components (27, 39, 41, and 43) of the liquid pressure device 29 by the plurality of flow channels 45 and plurality of valves are, for example, as follows.

(Flow Channels and Valves Relating to Forward Movement of Piston)

The pump 41 and the accumulator 43 are connected through a flow channel 45A. Due to this, for example, the hydraulic fluid is fed from the pump 41 to the accumulator 43 and thus pressure can be accumulated in the accumulator 43.

The flow channel 45A is provided with a check valve 49 which permits flow from the pump 41 to the accumulator 43, but prohibits flow in the opposite direction to the former. Due to this, backflow from the accumulator 43 to the pump 41 is prevented.

The accumulator 43 and the head-side chamber 31h are connected through a flow channel 45B. Due to this, for example, the hydraulic fluid is fed from the accumulator 43 to the head-side chamber 31h, and the piston 33 moves forward.

The flow channel 45B is provided with an ACC-use valve 51 which permits and prohibits the feed of the hydraulic fluid from the accumulator 43 to the head-side chamber 31h. The configuration of the ACC-use valve 51 may be made a suitable one. In the example shown, the ACC-use valve 51 is configured by a pilot operated check valve. This check valve prohibits flow from the accumulator 43 to the head-side chamber 31h and permits flow in the opposite direction to the former at the time when the pilot pressure is not introduced, while permits both of the flows when the pilot pressure is introduced.

The rod-side chamber 31r and the tank 39 can be connected through a flow channel 45C connected to the rod-side chamber 31r, and a flow channel 45D connected to the tank 39. Due to this, for example, when the piston 33 moves forward, the hydraulic fluid can be discharged from the rod-side chamber 31r to the tank 39.

The rod-side chamber 31r and the head-side chamber 31h can be connected through the above flow channel 45C and a flow channel 45E connected to the head-side chamber 31h. Due to this, for example, the hydraulic fluid which is discharged from the rod-side chamber 31r along with the forward movement of the piston 33 can be made to flow into the head-side chamber 31h. In turn, the hydraulic fluid required when moving the piston 33 forward can be reduced. In this way, the flow channels 45C and 45E configure a run-around circuit 53.

A servo valve 55 is interposed among the flow channels 45C to 45E. As shown in FIG. 2 in which the servo valve 55 is expressed by a symbol of 3-port and 3-position switching valve, the connection relationships of the flow channels 45C, 45D, and 45E are switched by the servo valve 55. Specifically, for example, at the center position among the shown three boxes, the flow channels 45C, 45D, and 45E are cut off from each other. At the position on the left side on the drawing sheet, the flow channel 45C (rod-side chamber 31r) and the flow channel 45D (tank 39) are connected and the flow channel 45C and the flow channel 45E (head-side chamber) are cut off (the run-around circuit 53 is switched to OFF). At the position on the right side on the drawing sheet, the flow channel 45C (rod-side chamber 31r) and the flow channel 45D (tank 39) are cut off and the flow channel 45C and the flow channel 45E (head-side chamber 31h) are connected (the run-around circuit 53 is switched to ON).

The servo valve 55 is configured so as to be able to control the flow rate of the hydraulic fluid from the flow channel 45C (rod-side chamber 31r) to the flow channel 45D (tank 39) or flow channel 45E (head-side chamber 31h) and functions also as a flow control valve. According to the control of the flow rate, for example, the speed of forward movement of the piston 33 is controlled. That is, the servo valve 55 configures a so-called meter-out circuit. Note that, the servo valve 55 is, for example, configured by a pressure compensated flow control valve able to hold the flow rate constant even if there is a pressure fluctuation. Further, the servo valve 55, as named in this way, is configured by a servo valve which is used in a servo mechanism and can modulate the flow rate steplessly (continuously, to any value) in accordance with the input signal.

The configuration of the servo valve 55 for driving the valve element (explained later) may be made a suitable one. Various known configurations may be applied. For example, the driving method may be an electrohydraulic system or may be an electrical system. In the electrohydraulic system, displacement of a solenoid (motor) in accordance with the input electrical signal is converted to a pilot pressure by a front-stage amplification part such as nozzle flapper, and the valve element is driven by the above pilot pressure. In the electrical system, for example, the displacement of the solenoid in accordance with the input electrical signal is transferred to the valve element without interposition of the liquid pressure. Further, the valve element may be biased by a spring so as to be positioned at the predetermined position when a driving force by electricity or liquid pressure is not imparted. Further, the configuration of the servo valve 55 for outputting a signal (feedback-use signal) in accordance with the position of the valve element may be made a suitable one. Various known configurations may be applied. For example, use may be made of a differential transformer.

The flow channel 45E is provided with a check valve 56 which permits flow from the servo valve 55 to the head-side chamber 31h and prohibits flow in the opposite direction to the former. Due to this, for example, backflow from the head-side chamber 31h to the rod-side chamber 31r is prevented.

(Flow Channels and Valves Related to Other Operations)

The pump 41 and the rod-side chamber 31r can be connected through a flow channel 45F connected to the pump 41, and a flow channel 45G connected to the rod-side chamber 31r. Due to this, for example, the hydraulic fluid can be fed from the pump 41 to the rod-side chamber 31r to move the piston 33 backward.

The head-side chamber 31h and the tank 39 can be connected through a flow channel 45H connected to the head-side chamber 31h, and a flow channel 45I connected to the tank 39. Due to this, for example, at the time when the piston 33 moves backward, the hydraulic fluid can be discharged from the head-side chamber 31h to the tank 39.

The pump 41 and the head-side chamber 31h can be connected through the already explained flow channel 45F and the already explained flow channel 45H. Due to this, for example, the hydraulic fluid can be fed from the pump 41 to the head-side chamber 31h and the piston 33 can be moved forward.

A switch valve 57 is interposed among the flow channels 45F to 45I. As shown in FIG. 2 in which the switch valve 57 is expressed by a symbol of a 4-port and 3-position switching valve, the connection relationships of the flow channels 45F to 45I are switched by the switch valve 57. Specifically, for example, at the center position among the shown three boxes, the flow channel 45G (rod-side chamber 31r), the flow channel 45H (head-side chamber 31h), and the flow channel 45I (tank 39) are connected to each other. Due to this, for example, depressurization of the injection cylinder 27 can be carried out. At the position on the left side on the drawing sheet, the flow channel 45F (pump 41) and the flow channel 45G (rod-side chamber 31r) are connected, and the flow channel 45H (head-side chamber) and the flow channel 45I (tank 39) are connected. Due to this, for example, the piston 33 can be moved backward. At the position on the right side on the drawing sheet, the flow channel 45F (pump 41) and the flow channel 45H (head-side chamber 31h) are connected, and the flow channel 45G (rod-side chamber 31r) and the flow channel 45I (tank 39) are connected. Due to this, for example, the piston 33 can be moved forward. Note that, as will be understood from the explanation imparted later, the switch valve 57 need not contribute to discharge of the hydraulic fluid from the rod-side chamber 31r to the tank 39 either.

The flow channel 45G is provided with a check valve 59 which permits flow from the switch valve 57 to the rod-side chamber 31r and prohibits flow in the opposite direction to the former. Due to this, for example, at the time when the flow rate of the hydraulic fluid discharged from the rod-side chamber 31r is controlled by the servo valve 55, flow from the rod-side chamber 31r to the switch valve 57 can be prohibited.

The flow channel 45H is provided with a control valve 61 which permits and prohibits flow between the head-side chamber 31h and the switch valve 57. The configuration of the control valve 61 may be made a suitable one. In the example shown, the control valve 61 is configured by a pilot operated check valve. This check valve prohibits flow from the head-side chamber 31h to the switch valve 57 and permits flow in the opposite direction to the former when the pilot pressure is not introduced and permits both flows when the pilot pressure is introduced. The control valve 61, for example, contributes to keeping the hydraulic fluid of the head-side chamber 31h from flowing to the switch valve 57 at the time when the hydraulic fluid is fed from the accumulator 43 to the head-side chamber 31h.

The liquid pressure device 29 has a back pressure eliminating cylinder 63. In the back pressure eliminating cylinder 63, of the two cylinder chambers partitioned by the piston, one is connected to the flow channel 45D, and the other is connected to a not shown air pressure source. Accordingly, for example, when the liquid pressure in the rod-side chamber 31r suddenly becomes high in the state where the rod-side chamber 31r and the tank 39 are connected by the servo valve 55, the impact thereof is absorbed by the back pressure eliminating cylinder 63.

(Various Sensors)

The injection device 9 has various sensors in order to grasp the operations of the injection driving part 25 etc. For example, the injection device 9 has a position sensor 65 for detecting the position and speed of the piston rod 35 (from another viewpoint, plunger 23) and various pressure sensors for detecting the liquid pressures at various positions in the liquid pressure system. As the pressure sensor, for example, provision is made of a head pressure sensor 67 which detects the pressure in the head-side chamber 31h and a rod pressure sensor 69 which detects the pressure in the rod-side chamber 31r. Other than these, for example, a pressure sensor which detects the pressure in the accumulator 43 may be provided as well.

The position sensor 65, for example, detects the position of the piston rod 35 relative to the cylinder part 31 and indirectly detects the position of the plunger 23. The configuration of the position sensor 65 may be made a suitable one. For example, the position sensor 65 may be one configured by a magnetic or optical linear encoder together with a not shown scale portion which is fixed to the piston rod 35 or may be configured by a laser length measurement device which measures the distance from a member fixed to the piston rod 35.

The position sensor 65 or control device 13, conceptually, can acquire (detect) the speed of the plunger 23 by differentiation of the position of the plunger 23. Accordingly, the position sensor 65 may be grasped as a speed sensor as well. For example, when the position sensor 65 is configured by a linear encoder, the position sensor 65 generates a pulse in accordance with the relative movement with a not shown scale portion. Further, the position sensor 65 and/or control device 13 can identify the relative positions of the position sensor 65 and the scale portion by cumulatively adding the number of the generate pulses. Further, the position sensor 65 and/or control device 13 can identify the speed by identifying the number of pulses per time.

The head pressure sensor 67 and rod pressure sensor 69 are, for example, utilized for indirect detection of the pressure (injection pressure etc.) which is applied to the molten metal by the plunger 23. For example, the control device 13 can calculate the pressure imparted to the molten metal by the plunger 23 based on the detection value of the head pressure sensor 67, detection value of the rod pressure sensor 69, pressure receiving area (area receiving pressure from the hydraulic fluid) of the piston 33 in the head-side chamber 31h, pressure receiving area of the piston 33 in the rod-side chamber 31r, and contact area of the plunger 23 with respect to the molten metal. Note that, in the following explanation, sometimes such an injection pressure based on such detection values of the head pressure sensor 67 and rod pressure sensor 69 (only the head pressure sensor 67 according to an embodiment) will be simply referred to as the "detection value of the injection pressure".

(Structure of Servo Valve)

Figure 3:
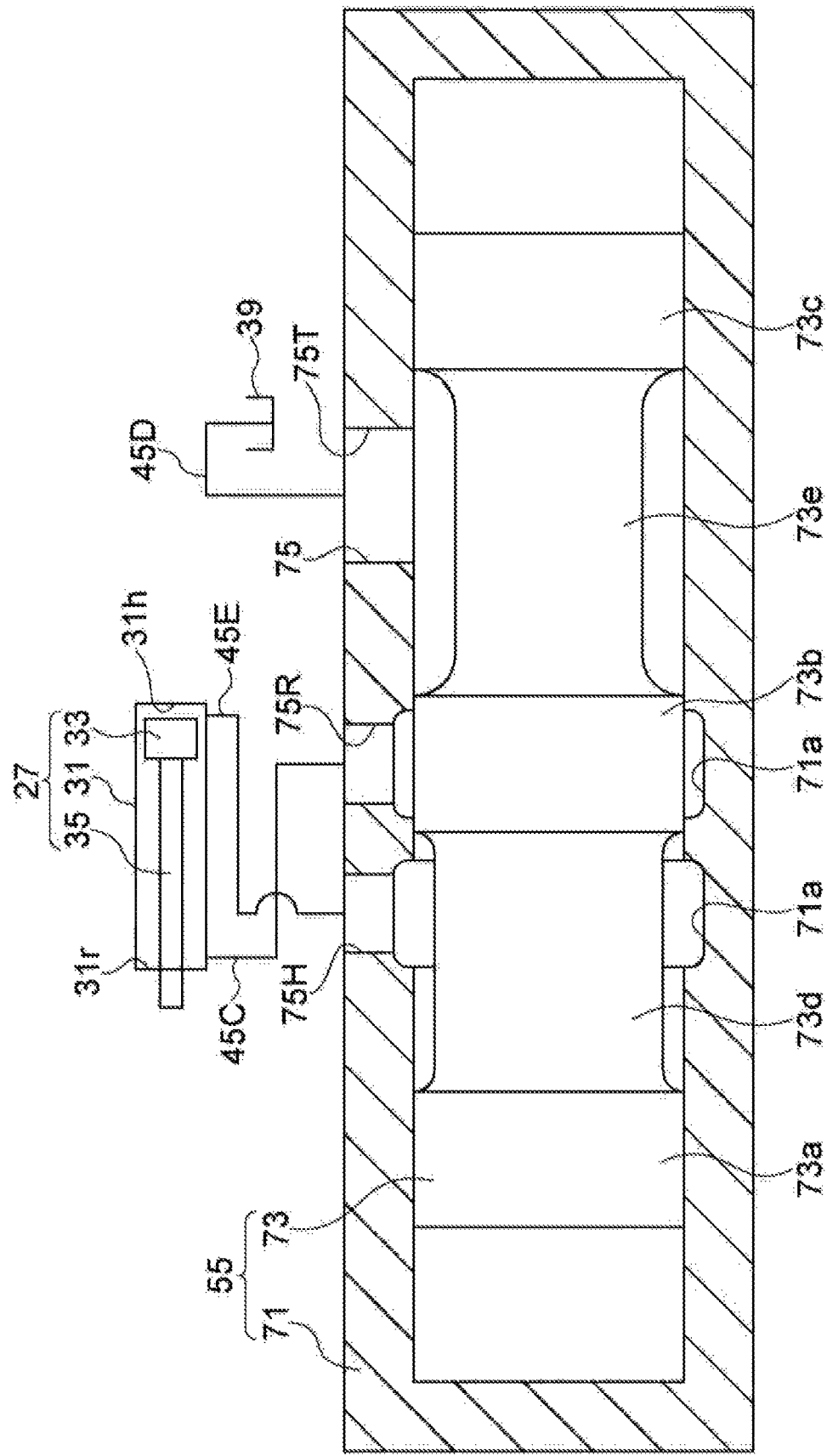
FIG. 3 is a schematic cross-sectional view showing the configuration of a principal part of a servo valve in the injection driving part in FIG. 2.

FIG. 3 is a schematic cross-sectional view showing the configuration of the principal part of the servo valve 55. In this view, in the servo valve 55, only the portion which directly controls the flow among the head-side chamber 31h, rod-side chamber 31r, and tank 39 is schematically shown. Accordingly, for example, illustrations of portions concerned with driving such as the solenoid, pilot flow channel and/or spring, the portion concerned with generation of the feedback signal such as the differential transformer, the portion prescribing the driving limit of the valve element, and the like are omitted.

The servo valve 55 is configured by a so-called spool type valve and has a valve sleeve 71 and a spool 73 which can slide in the axial direction inside the valve sleeve 71.

The valve sleeve 71 is a hollow member. The shape of the transverse cross-section (cross-section perpendicular to the right-left direction in FIG. 3) of the internal space in the valve sleeve 71 is, for example, substantially circular. In the inner circumferential surface (inner surface around the axis) of the valve sleeve 71, a rod-side port 75R, head-side port 75H, and tank-side port 75T which make the inside and the outside of the valve sleeve 71 communicate with each other are formed. Note that, in the following explanation, sometimes they will be simply referred to as the "ports 75" and will not be differentiated. In the example shown, in the port 75, a position of an opening at the inner surface of the valve sleeve 71 and a position of an opening at the outer surface of the valve sleeve 71 substantially coincide. However, according to the shape of the valve sleeve 71, it is also possible to offset the position of the opening at the outer surface from the position of the opening at the inner surface.

At the rod-side port 75R, the flow channel 45C (rod-side chamber 31r) is connected. At the head-side port 75H, the flow channel 45E (head-side chamber 31h) is connected. At the tank-side port 75T, the flow channel 45D (tank 39) is connected. These ports 75 are arranged in the order of the head-side port 75H, rod-side port 75R, and tank-side port 75T in the movement direction of the spool 73 (right-left direction in FIG. 3). Note that, the positions of these ports 75 about the axis of the valve sleeve 71 may be the same as each other (example shown) or may be different from each other.

At the inner circumferential surface of the valve sleeve 71, grooves 71a may be formed at positions corresponding to the ports 75 in the axial direction (movement direction of the spool 73) as well. In the example shown, among the three ports 75, groove portions 71a are provided at positions corresponding to the head-side chamber 31h and rod-side chamber 31r. Note that, the grooves 71a need not be provided and may be provided with respect to any of the three ports 75. The grooves 71a, for example, extend in directions about the axis of the valve sleeve 71, go around the valve sleeve 71, and are connected with the ports 75 (part or all may be grasped as parts of the ports 75 as well).

The spool 73 is, for example, formed into a shape of a column reduced in diameter at two portions in the axial direction. That is, the spool 73 has three large diameter portions 73a, 73b and 73c, and two small diameter portions 73d and 73e which are positioned among the large diameter portions and have smaller diameters than the large diameter portions. The large diameter portions are, for example, substantially column shaped so as to slide in the valve sleeve 71. The small diameter portions are substantially column shaped so that the outer circumferential surfaces are separated from the inner surface of the valve sleeve 71.

By the small diameter portions facing the two ports 75, the two ports 75 are communicated with each other. Further, by the large diameter portion facing any one port 75, that one port 75 is cut off from the other ports 75. Further, by the large diameter portion being positioned between any two ports, those two ports are cut off from each other. In the example shown, specifically, this is as follows.

In FIG. 3, the large diameter portion 73b at the center faces the rod-side port 75R. Due to this, the rod-side port 75R is cut off from both of the head-side port 75H and the tank-side port 75T. Further, from another viewpoint, the large diameter portion 73b is positioned between the head-side port 75H and the tank-side port 75T. Due to this, the head-side port 75H and the tank-side port 75T are mutually cut off. This state corresponds to the position at the center in the symbol of the servo valve 55 shown in FIG. 2 (state where discharge of the hydraulic fluid from the rod-side chamber 31r is prohibited).

Note that, the small diameter portion 73d faces the head-side port 75H (for example its entirety). The small diameter portion 73e faces the tank-side port 75T (for example its entirety). The large diameter portions 73a and 73c on the two sides contribute to separation between the small diameter portions 73d and 73e, and the two end parts of the valve sleeve 71. Although not particularly shown, the two end parts of the valve sleeve 71 are utilized for providing a driving part which drives the spool 73.

When the spool 73 moves from the state in FIG. 3 to the right side in FIG. 3, the left side small diameter portion 73d maintains a state facing the head-side port 75H while facing at least a part of the rod-side port 75R. Due to this, the head-side port 75H and the rod-side port 75R are communicated with each other. This state corresponds to the position at the right side of the symbol of the servo valve 55 shown in FIG. 2 (state where the run-around circuit 53 is switched ON).

In the process of movement of the spool 73 to the right side in FIG. 3, the left side small diameter portion 73d maintains a state facing the entirety of the head-side port 75H while gradually increases in area facing the rod-side port 75R. Due to this, a change of the degree of opening for controlling the flow rate of the hydraulic fluid flowing between the head-side port 75H and the rod-side port 75R is realized. The small diameter portion 73d is, for example, made able to move up to a position facing the entirety of the rod-side port 75R while facing the entirety of the head-side port 75H as it is. At this time, the degree of opening becomes the maximum.

Note that, cut-off between the rod-side port 75R and the tank-side port 75T is maintained by interposition of the large diameter portion 73b between the two. In the example shown, even if the spool 73 moves up to the position where the small diameter portion 73d faces the entirety of the rod-side port 75R, the large diameter portion 73b does not face the tank-side port 75T. However, the large diameter portion 73b may face part or all of the tank-side port 75T at the time when the spool 73 moves up to the above position as well.

Conversely to the above, when the spool 73 moves from the state in FIG. 3 to the left side in FIG. 3, the small diameter portion 73e on the right side maintains a state facing the tank-side port 75T while faces at least part of the rod-side port 75R. Due to this, the tank-side port 75T and the rod-side port 75R are communicated. This state corresponds to the left side position of the symbol of the servo valve 55 shown in FIG. 2.

In the process of the spool 73 moving to the left side in FIG. 3, the small diameter portion 73e on the right side maintains a state facing the entirety of the tank-side port 75T while gradually increases the area facing the rod-side port 75R. Due to this, the change of degree of opening for controlling the flow rate of the hydraulic fluid flowing between the tank-side port 75T and the rod-side port 75R is realized. In the example shown, however, before arrival of the small diameter portion 73e at the position where it faces the entirety of the rod-side port 75R, the area of the small diameter portion 73e which faces the tank-side port 75T begins to be reduced. The position immediately before that is treated as the position where the degree of opening is the maximum, so the movement of the spool 73 to the further left side from that position is not carried out. Note that, the servo valve 55 may be configured so that the state where the small diameter portion 73e faces the entirety of the tank-side port 75T is maintained until the small diameter portion 73e reaches the position where it faces the entirety of the rod-side port 75R as well.

Note that, cut-off between the rod-side port 75R and the head-side port 75H is maintained by interposition of the large diameter portion 73b between the two. Further, in the example shown, the large diameter portion 73b faces at least part of the head-side port 75H by movement of the spool 73 to the left side in FIG. 3. However, the large diameter portion 73b need not face the head-side port 75H either.

(Configuration of Signal Processing System)

Figure 4:
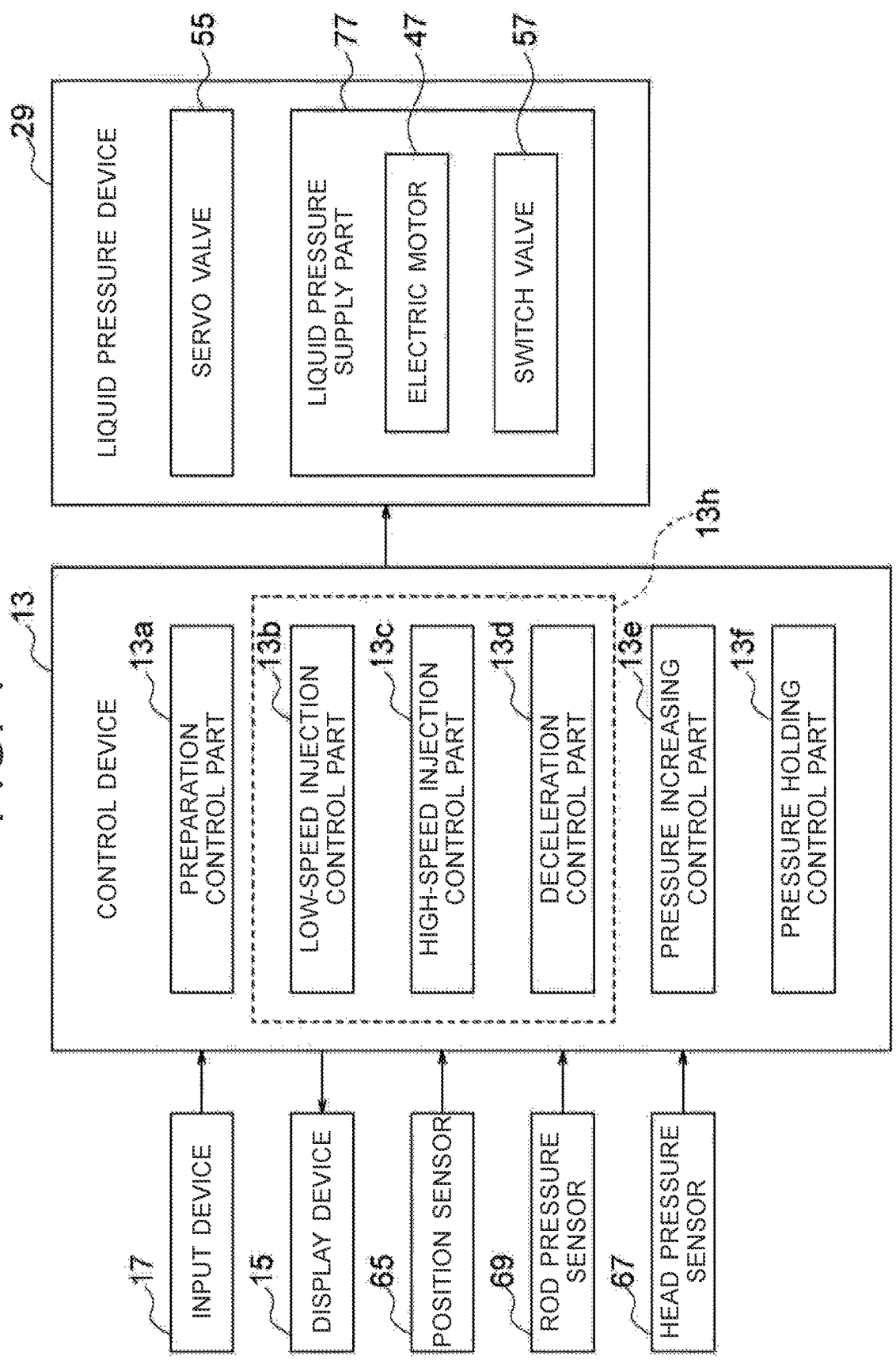
FIG. 4 is a block diagram showing the configuration relating to a signal processing system in the die casting machine according to the embodiment.

FIG. 4 is a block diagram showing the configuration of the signal processing system in the die casting machine 1.

The control device 13, for example, although not particularly shown, is configured by a computer including a CPU, RAM, ROM, and external storage device. By the CPU running programs stored in the ROM and external storage device, a plurality of functional parts (13a to 13f) carrying out various control operations or processing are constructed. The plurality of functional parts include, for example, a preparation control part 13a, low-speed injection control part 13b, high-speed injection control part 13c, deceleration control part 13d, pressure increasing control part 13e, and pressure holding control part 13f. Note that, the low-speed injection control part 13b and high-speed injection control part 13c (and deceleration control part 13d) will be sometimes referred to as the "injection control part 13h" all together. Details of control operations etc. performed by these plurality of functional parts will be explained in the explanation of the operation (FIG. 6 etc.) which will be imparted later.

The control device 13 receives as input various signals from various devices. The devices which input signals to the control device 13 are, for example, the input device 17, position sensor 65, rod pressure sensor 69, and head pressure sensor 67. Further, the control device 13 outputs control signals to various devices. The devices to which the control device 13 output signals are, for example, the liquid pressure device 29 of the injection device 9. Here, among the components of the liquid pressure devices 29, the servo valve 55, electric motor 47 driving the pump 41, and the switch valve 57 are shown.

As shown in FIG. 4, the liquid pressure device 29 may be grasped as being provided with a liquid pressure supply part 77. The liquid pressure supply part 77 includes the pump 41 (FIG. 2), electric motor 47, switch valve 57, and control valve 61 and feeds the hydraulic fluid to the head-side chamber 31h and rod-side chamber 31r. The operation thereof is controlled by the control device 13.

(Outline of Operation of Injection Device)

Figure 5:
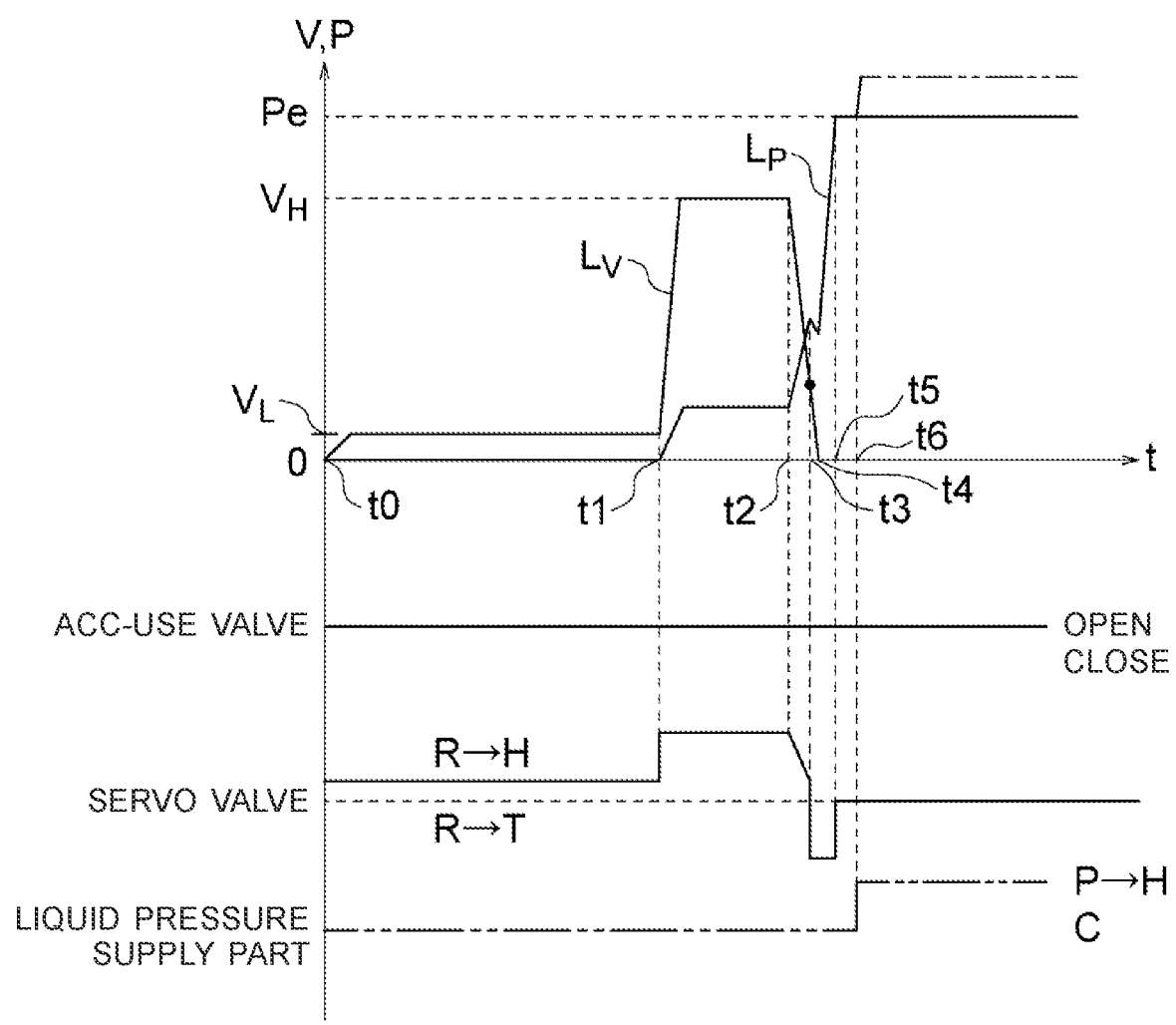
FIG. 5 is a view explaining the operation of the injection device according to the embodiment.

FIG. 5 is a view explaining the operation of the injection device 9. The upper part in FIG. 5 is a graph showing the changes along with time of the injection speed (speed of the plunger 23) and injection pressure (pressure imparted to the molten metal by the plunger 23). The lower part in FIG. 5 is a timing chart showing the operations of the ACC-use valve 51, servo valve 55, and liquid pressure supply part 77.

In FIG. 5, an abscissa "t" shows the time. In the graph in the upper part in FIG. 5, an ordinate shows the magnitudes of the injection speed V and injection pressure P. A line $L_V$ shows the change of the injection speed. A line $L_P$ shows the change of the injection pressure.

The line in the item "ACC-USE VALVE" means that the pilot pressure is introduced into the ACC-use valve 51 at the time of positioning at "OPEN" while means that the pilot pressure is not introduced into the ACC-use valve 51 at the time of positioning at "CLOSE". Note that, in the range shown, in the ACC-use valve 51, the pilot pressure is introduced at the point of time 0, then the pilot pressure is continuously introduced.

The solid line in the item "SERVO VALVE" in FIG. 5 means positioning at the center of the symbol in FIG. 2 (position prohibiting flow from the rod-side chamber 31r to the head-side chamber 31h and tank 39) at the time when it is located at the position indicated by a dotted line. Further, the above solid line means positioning on the right side of the symbol in FIG. 2 (position permitting flow from the rod-side chamber 31r to the head-side chamber 31h) at the time when it is located above the dotted line (position of "R→H"). Further, the above solid line means positioning on the left side of the symbol in FIG. 2 (position permitting flow from the rod-side chamber 31r to the tank 39) at the time when it is located lower than the dotted line (position of "R→T"). Further, the above solid line being separated more from the dotted line means the degree of opening (from another viewpoint, flow rate) being larger.

The item "LIQUID PRESSURE SUPPLY PART" in FIG. 5 is for explaining a modification which will be explained later and shows an operation different from the operation of the liquid pressure supply part 77 in the embodiment. Accordingly, the explanation is omitted here.

The injection device 9, viewed generally, performs a low-speed injection process (points of time t0 to t1), high-speed injection process (points of time t1 to t2), deceleration process (points of time t2 to t3), pressure increasing (pressure boosting) process (points of time t3 to t5), and pressure holding process (points of time t5-) in order in each casting cycle.

The low-speed injection process (points of time to to t1) is a process making the plunger 23 move forward at a low-speed injection speed $V_L$ which is a relatively low speed in the initial stage of injection. By the injection being carried out at the relatively low speed in this way, for example, entrapping of gas (air or the like) by the molten metal is reduced. The specific value of the low-speed injection speed $V_L$ may be suitably set by operation with respect to the input device 17 and is, for example, less than 1 m/s.

The high-speed injection process (points of time t1 to t2) is a process moving the plunger 23 forward at a high-speed injection speed $V_H$ which is higher than the low-speed injection speed $V_L$ following the low-speed injection process. By the injection being carried out at the relatively high speed in this way, for example, the molten metal can be filled in the cavity Ca without delaying the solidification of the molten metal. The specific value of the high-speed injection speed $V_H$ may be suitably set by operation of the input device 17 and is, for example, 1 m/s or more.

The deceleration process (points of time t2 to t3) is a process reducing the speed of the plunger 23. By performing control reducing the speed of the plunger 23, for example, the impact (surge pressure) which is generated when the molten metal is filled in the cavity Ca can be lowered.

The pressure increasing process (points of time t3 to t5) is a process raising the pressure which is imparted to the molten metal by the plunger 23 to thereby make the pressure of the molten metal reach the predetermined casting pressure Pe. The pressure holding process (points of time t5-) is a process maintaining the casting pressure Pe and waiting for the solidification of the molten metal. By raising the pressure of the molten metal and waiting for solidification, for example, blow holes and/or sink marks and the like can be reduced. The specific value of the casting pressure Pe may be suitably set by operation of the input device 17.

The ACC-use valve 51 is, for example, opened over the period from the above low-speed injection process to the pressure holding process by introducing of the pilot pressure. Due to this, the hydraulic fluid is fed from the accumulator 43 to the head-side chamber 31h, and force in the forward movement direction is applied to the piston 33. In turn, the above various processes become possible.

Further, by operation of the servo valve 55, switching of the above various processes is realized. Specifically, switching from the low-speed injection process to the high-speed injection process (point of time t1), switching from the high-speed injection process to the deceleration process (point of time t2), switching from the deceleration process to the pressure increasing process (point of time t3), and switching from the pressure increasing process to the pressure holding process (point of time t5) are realized.

(Details of Operation of Injection Device)

Figure 6:
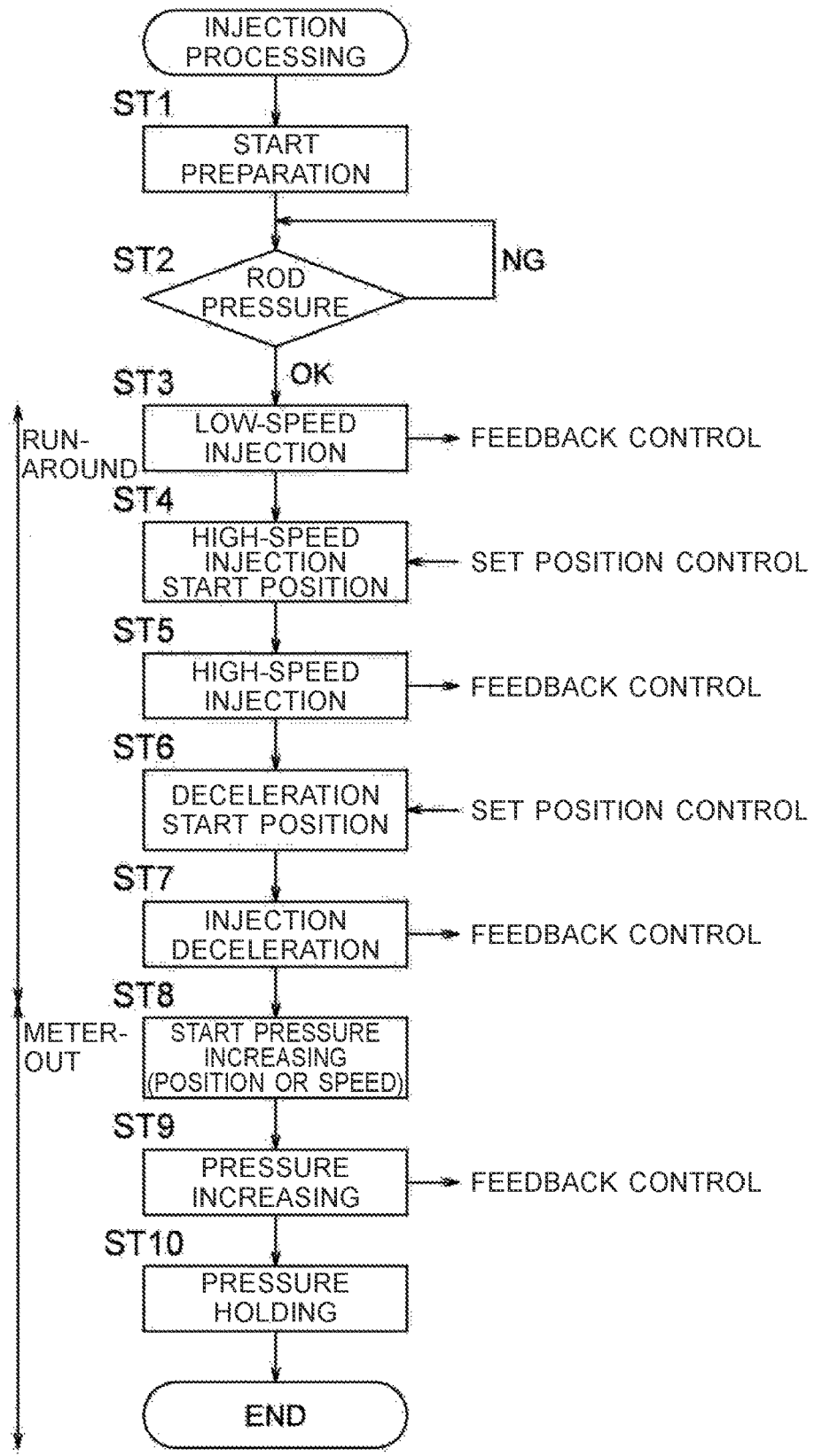
FIG. 6 is a flow chart showing one example of a procedure of injection processing executed by a control device according to the embodiment.

Referring to FIG. 6 and FIG. 7 in addition to FIG. 5, details of the operation of the injection device 9 will be explained. FIG. 6 is a flow chart showing one example of the procedure of the injection processing executed by the control device 13 in order to realize the operation of the injection device explained above. This processing is carried out for each casting cycle. Further, FIG. 7 is a time table showing the operations of the plurality of valves in the casting cycle.

In the column "SERVO VALVE" in FIG. 7, "C" indicates that the servo valve 55 is located at the center position in the symbol in FIG. 2 (flow from the rod-side chamber 31r to the head-side chamber 31h and to the tank 39 is prohibited). "R→H" indicates that the servo valve 55 is located at the position on the right side of the symbol in FIG. 2 (flow from the rod-side chamber 31r to the head-side chamber 31h is permitted). "R→T" indicates that the servo valve 55 is located at the position on the left side of the symbol in FIG. 2 (flow from the rod-side chamber 31r to the tank 39 is permitted).

In the column "ACC-USE VALVE", "–" indicates that the pilot pressure is not introduced into the ACC-use valve 51 (flow from the accumulator 43 to the head-side chamber 31h is prohibited). "P" indicates that the pilot pressure is introduced into the ACC-use valve 51 (flow from the accumulator 43 to the head-side chamber 31h is permitted).

In the column "CONTROL VALVE", "–" indicates that the pilot pressure is not introduced into the control valve 61 (flow from the head-side chamber 31h to the switch valve 57 is prohibited). "P" indicates that the pilot pressure is introduced into the control valve 61 (flow from the head-side chamber 31h to the switch valve 57 is permitted).

In the column "SWITCH VALVE", "C" indicates that the switch valve 57 is located at the center position in the symbol in FIG. 2 (flow from the pump 41 to the rod-side chamber 31r and to the head-side chamber 31h is prohibited). "P→R" indicates that the switch valve 57 is located at the position on the left side of the symbol in FIG. 2 (flow from the pump 41 to the rod-side chamber 31r is permitted). "P→H" indicates that the switch valve 57 is located at the position on the right side of the symbol in FIG. 2 (flow from the pump 41 to the head-side chamber 31h is permitted).

(Preparation Process: Before Point of Time t0)

As shown at step ST1 in FIG. 6 and the row "1" in FIG. 7, before the start of injection (before the point of time to in FIG. 5), the preparation process is carried out. Before the start of this preparation process, the injection device 9 has become the state as shown in FIG. 1 and FIG. 2. That is, the plunger 23 (piston 33) is positioned at the retraction limit. The liquid pressure device 29 is made a suitable state able to make the piston 33 positioned at the retraction limit. For example, the pilot pressure is not introduced into the ACC-use valve 51 and control valve 61, the servo valve 55 is closed (position at the center in FIG. 2), and the switch valve 57 cuts off the pump 41 from the injection cylinder 27.

Further, in the preparation process, the control device 13 (preparation control part 13a) switches the switch valve 57 to the position on the left side in FIG. 2, supplies the liquid pressure from the pump 41 to the rod-side chamber 31r, and raises the pressure in the rod-side chamber 31r. Due to this, at the time of start of injection (point of time t0), the probability of occurrence of so-called "jumping" is reduced. Specifically, this is as follows.

When the hydraulic fluid is fed to the head-side chamber 31*h* to move the piston 33 forward, the speed thereof is controlled according to the flow rate of the hydraulic fluid discharged from the rod-side chamber 31*r* as already explained. In theory, the speed of the piston 33 is uniquely determined by the flow rate of the hydraulic fluid discharged from the rod-side chamber 31*r*. In actuality, however, immediately after the start of forward movement of the piston 33, the hydraulic fluid of the rod-side chamber 31*r* is compressed, therefore the speed of the piston 33 becomes faster than the speed determined according to the flow rate of the hydraulic fluid discharged from the rod-side chamber 31*r*. That is, jumping occurs. However, by raising the pressure in the rod-side chamber 31*r* in advance as explained above and compressing the hydraulic fluid in the rod-side chamber 31*r*, the amount of compression of the hydraulic fluid in the rod-side chamber 31*r* at the time of start of the forward movement of the piston 33 is lowered and in turn jumping can be reduced.

As shown at step ST2 in FIG. 6, the control device 13 (preparation control part 13*a*), for example, judges whether the pressure detected by the rod pressure sensor 69 has reached a predetermined set pressure. Further, the preparation control part 13*a* continues imparting the liquid pressure from the pump 41 to the rod-side chamber 31*r* during negative judgment. Further, at the time of a positive judgment, the control device 13 proceeds to the next step. The above set pressure may be, for example, made the maximum pressure able to be imparted from the pump 41 to the rod-side chamber 31*r* (constant pressure which is reached when imparting liquid pressure from the pump 41 to the rod-side chamber 31*r* for a sufficient time) or may be made a pressure lower than the maximum pressure.

(Low-Speed Injection Process: t0 to t1)

As shown at step ST3 in FIG. 6 and the row "2" in FIG. 7, when the predetermined low-speed injection start condition is satisfied, the control device 13 (preparation control part 13*a*) switches the switch valve 57 to the position at the center in FIG. 2, suspends the feed of the hydraulic fluid from the pump 41 to the rod-side chamber 31*r*, and ends the preparation process. Simultaneously, the control device 13 (low-speed injection control part 13*b*) introduces the pilot pressure to the ACC-use valve 51 and supplies the hydraulic fluid from the accumulator 43 to the head-side chamber 31*h*. Further, the low-speed injection control part 13*b* switches the servo valve 55 to the position on the left side in FIG. 2 and renders the run-around circuit 53 ON. Due to this, the piston 33 (plunger 23) moves forward. That is, the low-speed injection process is started.

In more detail, the rod-side chamber 31*r* and the head-side chamber 31*h* are connected by the run-around circuit 53, whereby they become the same pressures as each other in theory. Further, the pressure receiving area of the piston 33 in the rod-side chamber 31*r* is smaller than the pressure receiving area of the piston 33 in the head-side chamber 31*h* by the area of the transverse cross-section of the piston rod 35. Accordingly, the force received by the piston 33 from the head-side chamber 31*h* becomes larger than the force which is received by the piston 33 from the rod-side chamber 31*r*, therefore the piston 33 moves forward. At this time, the hydraulic fluid discharged from the rod-side chamber 31*r* flows into the head-side chamber 31*h*.

The above low-speed injection start condition, for example, includes the fact that the positive judgment is made at step ST2 as described above in addition to the clamping of the fixed die 103 and movable die 105 being completed and the molten metal being fed to the sleeve 21. Note that, the operation of the die casting machine 1 may be set so that any of the completion of feed of the molten metal with respect to the injection sleeve 21 and the positive judgment at step ST2 is satisfied earlier as well.

The speed of the plunger 23 is controlled by adjustment of the degree of opening of the servo valve 55. Specifically, the control device 13 feedback controls the degree of opening of the servo valve 55 based on the detection value of the position sensor 65. This feedback control may be usual speed feedback control based on the error value of the speed itself of the plunger 23 or may be speed feedback control which is realized by the position feedback control based on the error value between the target position updated instant by instant at predetermined time intervals and the position at the present point of time.

(High-Speed Injection: t1 to t2)

As shown at step ST4 and ST5 in FIG. 6 and the row "3" in FIG. 7, when the plunger 23 reaches the predetermined high-speed injection start position (ST4), the control device 13 (high-speed injection control part 13*c*) switches the speed of the plunger 23 from the low-speed injection speed $V_L$ to the high-speed injection speed $V_H$ and performs the high-speed injection process.

Specifically, the high-speed injection control part 13*c*, as shown in the vicinity of the point of time t1 in FIG. 5, makes the degree of opening relating to the flow from the rod-side chamber 31*r* to the head-side chamber 31*h* in the servo valve 55 large and thereby make the flow rate relating to the flow large. Further, following the low-speed injection process, the high-speed injection control part 13*c* feedback controls the degree of opening of the servo valve 55 based on the detection value of the position sensor 65. This speed feedback control, in the same way as that in the low-speed injection process, may be one based on the error value of the speed itself or may be one realized by the position feedback control.

The high-speed injection start position may be suitably set based on operation of the input device 17. in a case where the speed feedback control is carried out based on the error value of the speed itself, for example, the high-speed injection control part 13*c* judges whether the plunger 23 has reached the high-speed injection start position based on the position of the plunger 23 detected by the position sensor 65 and changes the target speed when judging that it has reached it. Further, in a case where the speed feedback control which is substantially carried out by position feedback control with respect to the target position updated instant by instant is continued from the low-speed injection process to the high-speed injection process, for example, control is carried out based on the time sequence data of the target position from the low-speed injection process to the high-speed injection process. As a result, the speed of the plunger 23 is switched at the time when the plunger 23 reaches the above high-speed injection start position. In other words, judgment of whether the plunger 23 has reached the high-speed injection start position is not carried out.

(Deceleration Process: t2 to t3)

As shown at steps ST6 and ST7 in FIG. 6 and the row "4" in FIG. 7, the control device 13 (deceleration control part 13*d*) starts the deceleration process of decelerating the speed of the plunger 23 when the plunger 23 reaches a predetermined deceleration start position (ST6).

Specifically, as shown in the vicinity of the point of time t2 in FIG. 5, the deceleration control part 13*d* makes the degree of opening relating to the flow from the rod-side chamber 31r to the head-side chamber 31h in the servo valve 55 smaller to thereby make the flow rate relating to the above flow smaller. Further, following the high-speed injection process, the deceleration control part 13d feedback controls the degree of opening of the servo valve 55 based on the detection value of the position sensor 65. This speed feedback control, in the same way as in the low-speed injection process and high-speed injection process, may be one based on the error value of the speed itself or may be one realized by position feedback.

In a case where speed feedback control is carried out based on the error value of the speed itself, for example, the deceleration control part 13d judges whether the plunger 23 has reached the deceleration start position based on the position of the plunger 23 detected by the position sensor 65 and changes the target speed when judging that it has reached it. Further, in a case where the speed feedback control which is substantially carried out by the position feedback control with respect to the target position updated instant by instant is continued from the high-speed injection process to the deceleration process, for example, control is carried out based on the time sequence data of the target position from the high-speed injection process to the deceleration process. As a result, the speed of the plunger 23 is switched at the time when the plunger 23 reaches the above deceleration start position. In other words, judgment of whether the plunger 23 has reached the deceleration start position is not carried out.

The deceleration start position may be, for example, suitably set based on operation of the input device 17. When the molten metal is filled in the cavity Ca to a certain extent, the molten metal loses the place to go and the plunger 23 receives a reaction force from that filled molten metal and is suddenly decelerated. The deceleration start position may be suitably set so as to ease the impact at the time when such sudden deceleration is started. The start of deceleration and/or speed gradient may be greatly influenced by any of the control of the servo valve 55 as explained above and the reaction force from the molten metal.

(Pressure Increasing Process: t3 to t5)

As shown at step ST8 in FIG. 6 and the row "5" in FIG. 7, when the predetermined pressure increasing start condition is satisfied, the control device 13 (pressure increasing control part 13e) starts the pressure increasing control raising the injection pressure.

Specifically, as shown at the point of time t3 in FIG. 5 and the row "5" in FIG. 7, the control device 13 (pressure increasing control part 13e) switches the position of the servo valve 55 to the position on the left side in FIG. 2 and switches the destination of discharge of the hydraulic fluid from the rod-side chamber 31r from the head-side chamber 31h to the tank 39. Due to this, the pressure in the rod-side chamber 31r, in theory, is changed from a pressure equal to the pressure in the head-side chamber 31h to a tank pressure lower than the former. As a result, the pressure imparted to the molten metal by the plunger 23 becomes easier to be raised. In the process of increasing the pressure, the plunger 23 substantially stops (point of time t4).

The above pressure increasing start condition may be suitably set. For example, the pressure increasing start condition may be the fact that the injection pressure based on the detection values of the rod pressure sensor 69 and head pressure sensor 67 reaches a predetermined set pressure, the fact that the detection value of the head pressure sensor 67 reaches a predetermined set pressure, or the fact that the detection position of the plunger 23 detected by the position sensor 65 reaches a predetermined set position. The pressure increasing start condition (setting of the set pressure or set position and the like) may be, for example, set by operation of the input device 17.

The degree of opening of the servo valve 55 during the pressure increasing process may be suitably set and controlled. For example, the pressure increasing control part 13e may perform feedback control of the degree of opening of the servo valve 55 based on the injection pressure found from the detection values of the rod pressure sensor 69 and head pressure sensor 67 so that a desired pressure increasing curve set by operation of the input device 17 is obtained. In more detail, for example, the feedback control may be carried out so that the detection value of the injection pressure converges to the target pressure which is updated instant by instant at predetermined time intervals. Further, the degree of opening of the servo valve 55 during a pressure increasing process may be just maintained at the constant value (for example maximum value) without performing feedback control based on the injection pressure.

In general, the discharge of the hydraulic fluid from the rod-side chamber 31r to the tank 39 is permitted until the pressure increasing process and pressure holding process end. Accordingly, the pressure in the rod-side chamber 31r becomes the tank pressure. Further, the casting pressure Pe is determined by the pressure of the accumulator 43. However, if the discharge of the hydraulic fluid from the rod-side chamber 31r is prohibited in a process of the pressure in the rod-side chamber 31r approaching the pressure in the tank 39, the casting pressure Pe is determined by a force obtained by subtracting the force in the retraction direction which is imparted by the pressure of the rod-side chamber 31r to the piston 33 from the force in the forward movement direction imparted by the pressure of the accumulator 43 to the piston 33. That is, any casting pressure Pe can be realized. Such a technique is, for example, disclosed in Japanese Patent Publication No. 2004-330267 and Japanese Patent Publication No. 2011-224626. The contents may be incorporated by reference in the present application.

Near the point of time t5 in FIG. 5, an operation in a case where the servo valve 55 is switched to the position at the center in FIG. 2 in the process of the pressure in the rod-side chamber 31r approaching the tank pressure to prohibit the discharge of the hydraulic fluid from the rod-side chamber 31r to thereby realize any casting pressure Pe is shown. This switching may be carried out at the time when a suitable pressure increasing completion condition is satisfied. For example, the pressure increasing completion condition may be the fact that the injection pressure based on the detection values of the rod pressure sensor 69 and head pressure sensor 67 reaches a predetermined set pressure. The above set pressure may be the casting pressure Pe or may be a pressure obtained by adding or subtracting a correction amount to or from the casting pressure Pe. The correction amount may be decided by considering fluctuation of the injection pressure after closing the servo valve 55. Further, for example, the fact that a predetermined time from when starting the pressure increasing process passes may also be made the pressure increasing completion condition.

Note that, although not particularly shown, the control permitting the flow from the rod-side chamber 31r to the tank 39 over the periods of the pressure increasing process and pressure holding process and making the pressure in the rod-side chamber 31r the tank pressure may be carried out as well. In the explanation of the present embodiment, however, mainly an aspect where the pressure in the rod-side chamber 31*r* is not made the tank pressure will be taken as an example.

(Pressure Holding Process: t5-)

When the pressure increasing process ends as explained above, as shown at step ST10 in FIG. 6, the control device (pressure holding control part 13*f*) performs the pressure holding process. As shown in the row "6" in FIG. 7 and as understood from the explanation of the operation at the time of the end of the pressure increasing process explained above, the pressure holding control part 13*f* basically controls various valves so as to maintain the state prohibiting the discharge of the hydraulic fluid from the rod-side chamber 31*r* by the servo valve 55 in the pressure increasing process. Due to this, in theory, the casting pressure Pe is maintained.

During the period where this casting pressure Pe is maintained, the molten metal is cooled and solidifies. After that, the pressure holding control part 13*f* performs processing for ending the pressure holding process. For example, the pressure holding control part 13*f* may stop introduction of the pilot pressure to the ACC-use valve 51 and may stop the supply of the liquid pressure from the accumulator 43 to the head-side chamber 31*h*. Further, the pressure holding control part 13*f* may introduce the pilot pressure to the control valve 61, permit flow of the hydraulic fluid from the head-side chamber 31*h* to the tank 39, and make the head-side chamber 31*h* the tank pressure. The pressure holding control part 13*f* may permit flow of the hydraulic fluid from the rod-side chamber 31*r* to the tank 39 by the servo valve 55 and make the rod-side chamber 31*r* the tank pressure.

(After Pressure Holding Process)

Although not particularly shown, after the pressure holding process, the control device 13 make the clamping device 7 open the dies and extrude the molding product from the fixed die 103 by the ejection device 11. At this time, the control device 13 controls the liquid pressure device 29 so that the injection cylinder 27 generates a driving force for ejecting the biscuit by the plunger 23. This ejection may be realized by the same operation as the operation in the pressure increasing process (from another viewpoint, by the pressure of the accumulator 43) or may be realized by the operation in the row "8" in FIG. 7 (from another viewpoint, by the pressure of the pump 41) which will be explained later.

After that, the control device 13 makes the plunger 23 retract to the initial position. Specifically, as shown in the row "7" in FIG. 7, the servo valve 55 is switched to the position at the center in FIG. 2 and prohibits the discharge of the hydraulic fluid from the rod-side chamber 31*r*. The pilot pressure is not introduced to the ACC-use valve 51, and feed of the hydraulic fluid from the accumulator 43 to the head-side chamber 31*h* is prohibited. The pilot pressure is introduced to the control valve 61, flow from the head-side chamber 31*h* to the switch valve 57 is permitted. The switch valve 57 is switched to the position on the left side in FIG. 2, permits flow from the pump 41 to the rod-side chamber 31*r*, and permits flow from the head-side chamber 31*h* to the tank 39. Accordingly, the piston 33 retracts by the pressure of the pump 41.

Further, the control device 13 feeds the hydraulic fluid from the pump 41 to the accumulator 43 at a suitable timing and stores the pressure in the accumulator 43. Specifically, for example, by the electric motor 47 being driven in a state where the pilot pressure is not introduced into the ACC-use valve 51 and the switch valve 57 prohibits the feed of the hydraulic fluid from the pump 41 to the injection cylinder 27, the hydraulic fluid is fed from the pump 41 through the flow channel 45A to the accumulator 43.

(Forward Movement of Plunger by Pump)

As shown in "8" in FIG. 7, the injection device 9 is also able to feed the hydraulic fluid from the pump 41 to the head-side chamber 31*h* to make the piston 33 move forward. This operation is, for example, carried out when performing a predetermined operation with respect to the input device 17 to make the piston 33 move forward separately from the casting cycle.

Specifically, the servo valve 55 is switched to the position on the left side in FIG. 2 and permits the discharge of the hydraulic fluid from the rod-side chamber 31*r* to the tank 39. The pilot pressure is not introduced to the ACC-use valve 51, feed of the hydraulic fluid from the accumulator 43 to the head-side chamber 31*h* is prohibited. To the control valve 61, the pilot pressure may be introduced or may not be introduced. In any case, flow from the switch valve 57 to the head-side chamber 31*h* is permitted. The switch valve 57 is switched to the position on the right side in FIG. 2 and permits the flow from the pump 41 to the head-side chamber 31*h*.

Note that, in the above explanation, the hydraulic fluid in the rod-side chamber 31*r* is discharged through the servo valve 55 to the tank 39. However, the above hydraulic fluid may be discharged through the servo valve 55 to the head-side chamber 31*h* as well. Further, the check valve 59 may be configured so as to be opened by the pilot pressure, and the hydraulic fluid may be discharged from the rod-side chamber 31*r* to the tank 39 through the check valve 59 and switch valve 57 as well.

(Details of Pressure Holding Process)

Figure 8:
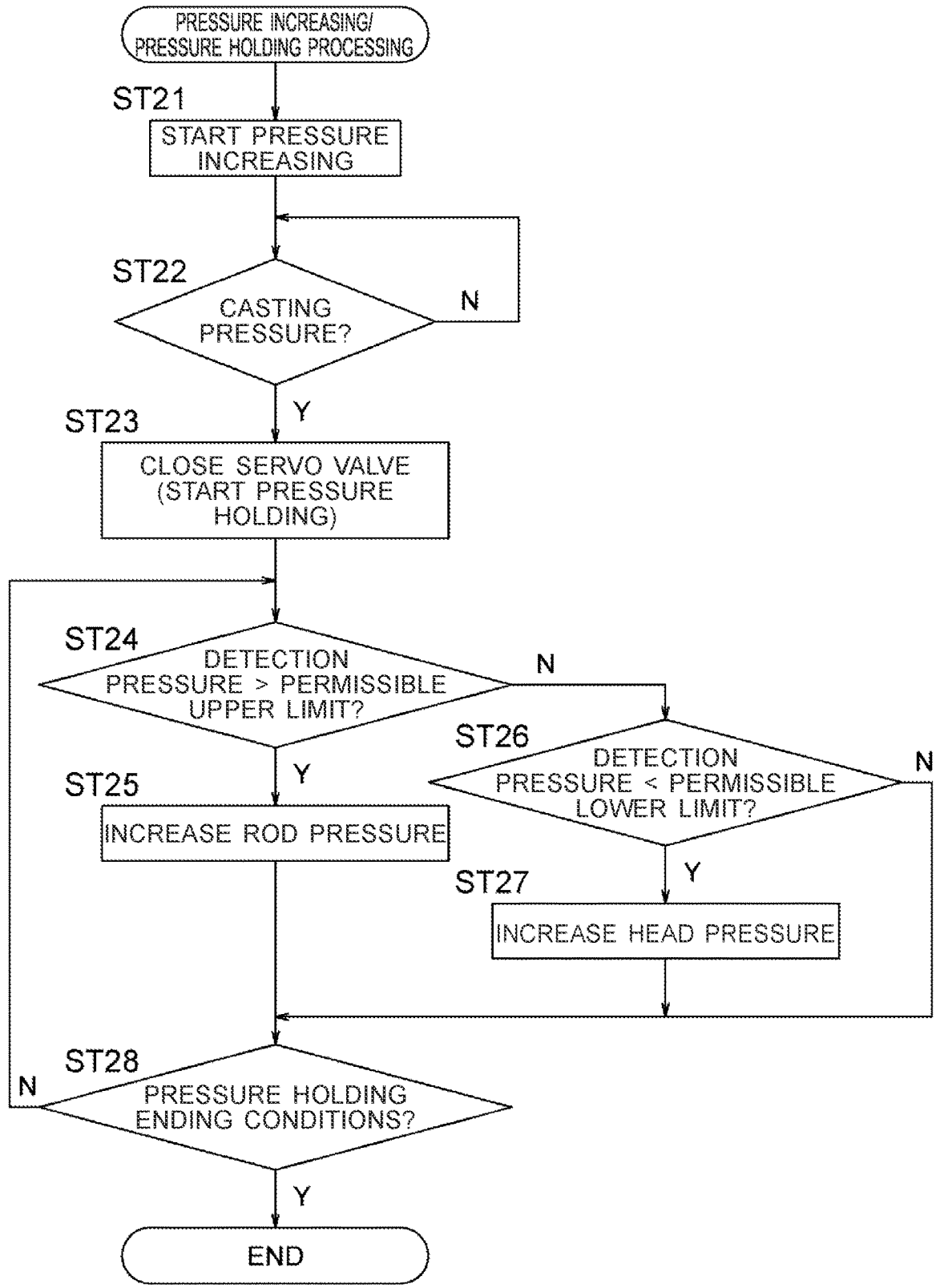
FIG. 8 is a flow chart showing one example of a procedure of a pressure increasing/pressure holding processing executed by the control device according to the embodiment.

FIG. 8 is a flow chart showing one example of the procedure of the pressure increasing/pressure holding processing executed by the control device 13 in the pressure increasing process and pressure holding process.

Steps ST21 to ST23 correspond to the pressure increasing process. Specifically, at step ST21, the control device (pressure increasing control part 13*e*) starts the pressure increasing process. At step ST22, the control device 13 (pressure increasing control part 13*e*) judges whether the pressure increasing completion condition is satisfied. FIG. 8 illustrates judgment of whether the injection pressure based on the detection values of the rod pressure sensor 69 and head pressure sensor 67 has reached the casting pressure Pe as the pressure increasing completion condition. Further, the control device 13 continues the pressure increasing process at the time of negative judgment, while proceeds to step ST23 at the time of positive judgment. At step ST23, the servo valve 55 is switched to the position at the center in FIG. 2, the discharge of the hydraulic fluid from the rod-side chamber 31*r* is prohibited, and the pressure increasing process is completed. From another viewpoint, the pressure holding process is started.

Here, in the pressure holding process, basically liquid pressure continues to be imparted from the accumulator 43 to the head-side chamber 31*h*, and the discharge of the hydraulic fluid from the rod-side chamber 31*r* is prohibited. Accordingly, in theory, the casting pressure Pe which was realized according to the pressure of the accumulator 43 and the pressure in the rod-side chamber 31*r* at the time when the discharge of the hydraulic fluid from the rod-side chamber 31*r* was prohibited by the servo valve 55 is maintained.

In actuality, however, there is a possibility of fluctuation of the pressure imparted from the plunger 23 to the molten metal during the pressure holding process due to leakage of the hydraulic fluid. For example, if leakage occurs on the rod-side chamber 31r side and the pressure in the rod-side chamber 31r falls, the injection pressure rises and becomes larger than the casting position Pe. Conversely, if leakage arises on the head-side chamber 31h side and the pressure of the accumulator 43 falls, the injection pressure falls and becomes smaller than the casting pressure Pe. Therefore, as shown at steps ST24 to ST27, processing supplementing the hydraulic fluid from the pump 41 to the rod-side chamber 31r or head-side chamber 31h may be carried out.

At step ST24, the control device 13 (pressure holding control part 13f) judges whether the detection value of the injection pressure based on the detection values of the rod pressure sensor 69 and head pressure sensor 67 is over the predetermined permissible upper limit. Further, the pressure holding control part 13f proceeds to step ST25 at the time of positive judgment, while proceeds to step ST26 at the time of negative judgment. The permissible upper limit is a pressure larger than the casting pressure Pe. The permissible upper limit may be set by operation of the input device 17 or may be set by the pressure holding control part 13f based on the casting pressure Pe.

At step ST25, the pressure holding control part 13f controls the liquid pressure supply part 77 so as to temporarily impart the liquid pressure of the pump 41 to the rod-side chamber 31r to raise the pressure in the rod-side chamber 31r. Due to this, the injection pressure falls. More specifically, as indicated by parentheses in the row "6" in FIG. 7, the pressure holding control part 13f switches the switch valve 57 to the position on the left side in FIG. 2 to permit flow from the pump 41 to the rod-side chamber 31r. Note that, the flow channel 45H communicated with the head-side chamber 31h, and the tank 39 are connected by the switch valve 57. However, the discharge of the hydraulic fluid from the head-side chamber 31h to the tank 39 is prohibited by the control valve 61 into which the pilot pressure is not introduced.

The operation raising the pressure in the rod-side chamber 31r may be, for example, one carried out only for a predetermined time or may be one carried out until the detection value of the injection pressure satisfies a predetermined condition. The predetermined condition may be the detection value of the injection pressure being lower than the permissible upper limit or may be lowering of the detection value of the injection pressure to the casting pressure Pe (or a pressure adjusting a predetermined correction amount with respect to the casting pressure Pe). After raising the pressure of the rod-side chamber 31r, the pressure holding control part 13f makes the switch valve 57 return to the center position in FIG. 2 (position prohibiting flow from the pump 41 to the injection cylinder 27) and proceeds to step ST28.

At step ST26, the pressure holding control part 13f judges whether the detection value of the injection pressure based on the detection values of the rod pressure sensor 69 and head pressure sensor 67 becomes lower than a predetermined permissible lower limit. Further, the pressure holding control part 13f proceeds to step ST27 at the time of positive judgment, while proceeds to step ST28 at the time of negative judgment. The permissible lower limit is a pressure smaller than the casting pressure Pe. The permissible lower limit may be set by operation of the input device 17 or may be set by the pressure holding control part 13f based on the casting pressure Pe.

At step ST27, the pressure holding control part 13f controls the liquid pressure supply part 77 so as to temporarily impart the liquid pressure of the pump 41 to the head-side chamber 31h to raise the pressure in the head-side chamber 31h. Due to this, the injection pressure rises. More specifically, as indicated in the parentheses in the row "6" in FIG. 7, the pressure holding control part 13f switches the switch valve 57 to the position on the right side in FIG. 2 to permit flow from the pump 41 to the head-side chamber 31h (accumulator 43). Note that, the flow channel 45G communicated with the rod-side chamber 31r, and the tank 39 are connected by the switch valve 57. However, the discharge of the hydraulic fluid from the rod-side chamber 31r to the tank 39 is prohibited by the check valve 59.

The operation raising the pressure in the head-side chamber 31h may be, for example, one carried out only for a predetermined time or may be one carried out until the detection value of the injection pressure satisfies a predetermined condition. The predetermined condition may be the detection value of the injection pressure being higher than a permissible lower limit or may be rising of the detection value of the injection pressure to the casting pressure Pe (or a pressure adjusting a predetermined correction amount with respect to the casting pressure Pe). The pressure holding control part 13f, after raising the pressure of the head-side chamber 31h, makes the switch valve 57 return to the center position in FIG. 2 (position prohibiting flow from the pump 41 to the injection cylinder 27) and proceeds to step ST28.

At step ST28, the pressure holding control part 13f judges whether the pressure holding ending condition is satisfied. It returns to step ST24 at the time of negative judgment, while ends the pressure holding process at the time of positive judgment. The pressure holding ending condition may be, for example, made the elapse of a predetermined time (for example a time long enough for the molten metal to solidify) from a predetermined point of time (for example the point of time when the pressure holding process starts).

As explained above, in the present embodiment, the injection device 9 has the injection cylinder 27, run-around circuit 53, tank 39, and servo valve 55. The injection cylinder 27 drives the plunger 23 which ejects the molding material into the die 101. The run-around circuit 53 makes the hydraulic fluid discharged from the rod-side chamber 31r along with the forward movement of the piston 33 in the injection cylinder 27 flow into the head-side chamber 31h. The tank 39 receives the hydraulic fluid discharged from the rod-side chamber 31r along with the forward movement of the piston 33. The servo valve 55 is provided in the run-around circuit 53 and is connected to the tank 39. The servo valve 55 can be switched between a first state (position on right side in FIG. 2) and a second state (position on left side in FIG. 2). In the first state, the servo valve 55 permits flow from the rod-side chamber 31r to the head-side chamber 31h, while prohibits flow from the rod-side chamber 31r to the tank 39. In the second state, the servo valve 55 prohibits flow from the rod-side chamber 31r to the head-side chamber 31h, while permits flow from the rod-side chamber 31r to the tank 39. The servo valve 55 can control the flow rate of the hydraulic fluid discharged from the rod-side chamber 31r in each of the first state and second state.

Accordingly, the ON/OFF switching of the run-around circuit 53, communication and cut-off between the rod-side chamber 31r and the tank 39, and control of the flow rate of the hydraulic fluid discharged from the rod-side chamber 31r are realized by one servo valve 55. As a result, for example, simplification of the configuration, simplification of control, smoothing of switching among processes (for example switching from the deceleration process to pressure increasing process), and/or reduction of costs can be expected.

In the present embodiment, the servo valve 55 can be switched among the above first state, above second state, and a third state (position at the center in FIG. 2) prohibiting flow from the rod-side chamber 31r to both of the head-side chamber 31h and tank 39.

In this case, for example, the operations which can be realized by the servo valve 55 increase, therefore the effect of simplification explained above is improved. For example, the servo valve 55 can be utilized for realizing any casting pressure Pe by prohibiting the discharge of the hydraulic fluid from the rod-side chamber 31r in the process of lowering the pressure in the rod-side chamber 31r in the pressure increasing process.

In the present embodiment, the servo valve 55 has the hollow valve body (valve sleeve 71) and the valve element (spool 73) movable in the valve sleeve 71. The valve sleeve 71 has the rod-side port 75R communicated with the rod-side chamber 31r, the head-side port 75H communicated with the head-side chamber 31h, and the tank-side port 75T communicated with the tank 39. The spool 73 can move between the position where the rod-side port 75R and the head-side port 75H are interconnected and the rod-side port 75R and the tank-side port 75T are cut off from each other and the position where the rod-side port 75R and the head-side port 75H are cut off from each other and the rod-side port 75R and the tank-side port 75T are interconnected.

In this case, for example, by just movement of the spool 73 relative to the valve sleeve 71, both of switching of the destination of discharge of the hydraulic fluid from the rod-side chamber 31r and control of the flow rate can be carried out, therefore the effect of simplification is improved.

In the present embodiment, the servo valve 55 is the spool valve having the valve sleeve 71 as the valve body and the spool 73 as the valve element. The rod-side port 75R, head-side port 75H, and tank-side port 75T are open at the inner circumferential surface around the axis of the valve sleeve 71. The spool 73 slides in the valve sleeve 71 in the axial direction. The head-side port 75H is positioned on one side (left side in FIG. 3) in the movement direction of the spool 73 relative to the rod-side port 75R. The tank-side port 75T is positioned on the other side (right side in FIG. 3) in the movement direction of the spool 73 relative to the rod-side port 75R. The spool 73 has the large diameter portion 73b and small diameter portions 73d and 73e. The large diameter portion 73b has a diameter enabling sliding relative to the valve sleeve 71 and can close the entirety of the rod-side port 75R. The small diameter portion 73d is positioned on the above one side (left side in FIG. 3) relative to the large diameter portion 73b, has a smaller diameter than the large diameter portion 73b, and can make the rod-side port 75R and the head-side port 75H communicate with each other by facing the two. The small diameter portion 73e is positioned on the above other side (right side in FIG. 3) relative to the large diameter portion 73b, has a smaller diameter than the large diameter portion 73b, and can make the rod-side port 75R and the tank-side port 75T communicate with each other by facing the two.

In this case, for example, both of the two destinations (head-side port 75H and tank-side port 75T) of the hydraulic fluid flowing in from the rod-side port 75R to the valve sleeve 71 are adjacent to the rod-side port 75R. As a result, for example, the configuration can be simplified and the switching of destination of the hydraulic fluid can be made faster. Further, for example, compared with an aspect where one small diameter portion making the rod-side port 75R and the other port communicate with each other is provided between two large diameter portions able to close the head-side port 75H and the tank-side port 75T (this aspect is also included in the technique according to the present disclosure) unlike the present embodiment, the large diameter portion regulating the flow of the hydraulic fluid directly acts upon the rod-side port 75R. As a result, for example, improvement of accuracy of control of the flow rate of the hydraulic fluid discharged from the rod-side chamber 31r can be expected.

Further, in the present embodiment, the injection device 9 has the check valve 56. The check valve 56 is positioned between the head-side chamber 31h and the servo valve 55 in the run-around circuit 53, prohibits flow from the head-side chamber 31h to the servo valve 55, and permits flow from the servo valve 55 to the head-side chamber 31h.

In this case, for example, at the time when the hydraulic fluid is fed from the accumulator 43 to the head-side chamber 31h in a state where the run-around circuit 53 is ON, the probability of occurrence of flow from the head-side chamber 31h to the rod-side chamber 31r is reduced.

Further, in the present embodiment, the injection device 9 has the injection control part 13h and pressure increasing control part 13e. At least during the period of the low-speed injection process and high-speed injection process, the injection control part 13h controls the servo valve 55 so as to become the above first state (state where the run-around circuit 53 is ON). Further, the pressure increasing control part 13e controls the servo valve 55 so as to become the above second state (state where flow from the rod-side chamber 31r to the tank 39 is permitted) at least during the period of the pressure increasing process.

In this case, the required amount of the hydraulic fluid can be reduced by the run-around circuit 53 in the low-speed injection process and high-speed injection process in which the movement distance of the piston 33 is relatively long. On the other hand, in the pressure increasing process, it is possible to make the pressure difference between the rod-side chamber 31r and the head-side chamber 31h larger to quickly raise the pressure.

Further, in the present embodiment, the injection device 9 has the liquid pressure supply part 77 and pressure holding control part 13f. The liquid pressure supply part 77 includes the liquid pressure source (pump 41). The pressure holding control part 13f controls the liquid pressure supply part 77 so as to give the liquid pressure from the pump 41 to the rod-side chamber 31r temporarily (at the time of positive judgment at step ST24).

In this case, for example, at the time when the hydraulic fluid leaks from the rod-side chamber 31r during the pressure holding process and the pressure in the rod-side chamber 31r falls and in turn the injection pressure becomes larger than the casting pressure Pe, the pressure in the rod-side chamber 31r is raised, whereby the injection pressure can be made closer to the casting pressure Pe. As a result, the quality of the die casting product be improved.

Further, in the present embodiment, the injection device 9 has the accumulator 43 and the ACC-use valve 51 which controls the flow of the hydraulic fluid from the accumulator 43 to the head-side chamber 31h. The pressure holding control part 13f controls the ACC-use valve 51 so that the liquid pressure is continuously imparted from the accumulator 43 to the head-side chamber 31h during the period of the pressure holding process and controls the liquid pressure supply part 77 so as to give the liquid pressure from the pump 41 in the liquid pressure supply part 77 to the head-side chamber 31h temporarily (at the time when the positive judgment is carried out at step ST26) during the period of the pressure holding process.

In this case, for example, when the hydraulic fluid leaks from the head-side chamber 31*h* (accumulator 43) during the pressure holding process and the pressure in the head-side chamber 31*h* falls and in turn the injection pressure becomes smaller than the casting pressure Pe, the pressure in the head-side chamber 31*h* is raised, whereby the injection pressure can be made closer to the casting pressure Pe. As a result, the quality of the die casting product can be improved.

Further, in the present embodiment, the injection device 9 has the preparation control part 13*a*. The preparation control part 13*a* controls the liquid pressure supply part 77 so as to impart the liquid pressure from the liquid pressure source (pump 41) to the rod-side chamber 31*r* before the start of injection and make the pressure in the rod-side chamber 31*r* at the time of start of injection higher than the pressure of the tank 39.

Accordingly, as already explained, the probability of occurrence of jumping is lowered. Further, the operation lowering the probability of occurrence of jumping is carried out by the liquid pressure supply part 77 which imparts the liquid pressure to the rod-side chamber 31*r* during the pressure holding process, therefore the configuration is simplified.

(Modification)

In the embodiment, the pressure holding process was realized by the pressure being continuously imparted from the accumulator 43 to the head-side chamber 31*h*. However, the pressure holding process may be realized by the pressure being continuously imparted from the pump 41 to the head-side chamber 31*h* as well.

In the item of "LIQUID PRESSURE SUPPLY PART" in FIG. 5, the operation of the liquid pressure supply part in such a modification is indicated by a dotted line. In the drawing, "P→H" shows that the liquid pressure is imparted from the pump 41 to the head-side chamber 31*h*. "C" shows that imparting liquid pressure as explained above is not carried out.

In the example in FIG. 5, up to any point of time t6 during the pressure holding process, the same operation as that in the embodiment is carried out. The point of time t6 may be the pressure holding start point of time (pressure increasing completion point, point of time t5) or may be a point of time after the former point of time (example shown). Further, the point of time t6 may be, for example, set by operation of the input device 17.

Further, after the point of time t6, until the pressure holding process is completed, the hydraulic fluid is continuously fed from the pump 41 to the head-side chamber 31*h*. Due to this, the pressure in the head-side chamber 31*h* becomes the pump pressure. The accumulator 43 releases the hydraulic fluid to the injection cylinder 27 during the period from the low-speed injection to the pressure increasing process after accumulation of the pressure by the pump 41, therefore the pressure of the accumulator 43 becomes lower than the pump pressure. Accordingly, by imparting the liquid pressure from the pump 41 to the head-side chamber 31*h* and holding the pressure, compared with the case where the liquid pressure is imparted from the accumulator 43 to the head-side chamber 31*h*, a high casting pressure can be obtained.

The state of the liquid pressure device 29 at the time when the liquid pressure is imparted from the pump 41 to the head-side chamber 31*h* during the pressure holding process may be made, for example, the state which is the same as or similar to the state where the pressure in the head-side chamber 31*h* is raised at step ST27. Specifically, the servo valve 55 may be made the position at the center in FIG. 2 (position prohibiting the discharge of the hydraulic fluid from the rod-side chamber 31*r*). However, the present modification may be applied to an aspect where the pressure in the rod-side chamber 31*r* is made the tank pressure as well. The ACC-use valve 51, for example, unlike step ST27, may be made a state where the pilot pressure is not introduced. However, the pilot pressure may be introduced in the same way as step ST27 as well. The control valve 61 permits flow from the switch valve 57 to the head-side chamber 31*h* by introduction of the pilot pressure. The switch valve 57 is switched to the position on the right side in FIG. 2 to permit flow from the pump 41 to the head-side chamber 31*h*.

Note that, operation of the embodiment or operation of the modification may be selected by operation of the input device 17 as well.

In the above embodiment, the die casting machine 1 is one example of the molding machine. The molten metal is one example of the molding material. The valve sleeve 71 is one example of the valve body. The spool 73 is one example of the valve element. The small diameter portion 73*d* is one example of the head-side small diameter portion. The small diameter portion 73*e* is one example of the tank-side small diameter portion. The pump 41 is one example of the liquid pressure source.

The technique according to the present disclosure is not limited to the embodiment and modification explained above and may be executed in various ways.

The molding machine is not limited to a die casting machine. For example, the molding machine may be another metal molding machine, may be an injection molding machine for molding a resin, or may be a molding machine molding a material obtained by mixing a thermoplastic resin or the like with wood powder. Further, the molding machine is not limited to a horizontal clamping and horizontal injection type. For example, it may be a vertical clamping and vertical injection, horizontal clamping and vertical injection, or vertical clamping and horizontal injection type.

The servo valve is not limited to a spool valve. For example, the servo valve may be a rotary valve in which the valve element rotates relative to the valve body or may be a valve in which the distance between the valve element and the port changes in the opening direction of the port. Further, the servo valve need not be able to be switched to the third state where all of flows from the rod-side chamber to the head-side chamber and tank are prohibited either. During the switching between the first state and the second state, a state may arise permitting all of flows from the rod-side chamber to the head-side chamber and the tank as well.

The configuration of the liquid pressure device shown in the embodiment is just one example. Various configurations are possible as the configurations of the flow channels and valves other than the configurations shown. Further, the injection cylinder may be made a booster type cylinder as well. The accumulator may include two types of accumulators for injection and pressure increasing as well. The liquid pressure supply part is not limited to a combination of the pump and the valve. For example, it may be one including a liquid pressure cylinder and an electric motor which drives the rod in the liquid pressure cylinder to send out the hydraulic fluid from the liquid pressure cylinder as well. The operation of raising the rod pressure and head pressure during the pressure holding process may be one driving the pump for only a required time and preventing the backflow from the injection cylinder to the pump by the check valve.

REFERENCE SIGNS LIST

1 . . . die casting machine, 9 . . . injection device, 21 . . . sleeve, 23 . . . plunger, 27 . . . injection cylinder, 31r . . . rod-side chamber, 31h . . . head-side chamber, 33 . . . piston, 39 . . . tank, 53 . . . run-around circuit, and 55 . . . servo valve.

The invention claimed is:

1. An injection device comprising:
an injection cylinder configured to drive a plunger ejecting a molding material into a mold;
a run-around circuit configured to cause a hydraulic fluid discharged from a rod-side chamber in the injection cylinder along with a forward movement of a piston in the injection cylinder to flow into a head-side chamber in the injection cylinder;
a tank configured to receive the hydraulic fluid discharged from the rod-side chamber along with the forward movement of the piston; and
a servo valve provided in the run-around circuit and connected to the tank, wherein the servo valve comprises one valve element, and is configured to:
achieve a first state where flow from the rod-side chamber to the head-side chamber is permitted while flow from the rod-side chamber to the tank is prohibited by the one valve element moving to a first position, and
achieve a second state where flow from the rod-side chamber to the head-side chamber is prohibited while flow from the rod-side chamber to the tank is permitted by the one valve element moving to a second position, and
control a flow rate of the hydraulic fluid discharged from the rod-side chamber in each of the first state and the second state by adjusting the position of the one valve element.

2. The injection device according to claim 1, wherein the servo valve is configured to be switched among the first state, the second state, and a third state where both of flows from the rod-side chamber to the head-side chamber and the tank are prohibited.

3. The injection device according to claim 1, wherein:
the servo valve comprises:
a hollow valve body, and
a valve element configured to move inside the valve body;
the valve body comprises:
a rod-side port communicated with the rod-side chamber,
a head-side port communicated with the head-side chamber, and
a tank-side port communicated with the tank; and
the valve element is configured to move between:
a position where the rod-side port and the head-side port are communicated with each other and where the rod-side port and the tank-side port are cut off from each other, and
a position where the rod-side port and the head-side port are cut off from each other and where the rod-side port and the tank-side port are communicated with each other.

4. The injection device according to claim 3, wherein:
the servo valve is a spool valve comprising:
a valve sleeve as the valve body in which the rod-side port, the head-side port, and the tank-side port are open at an inner circumferential surface around an axis, and
a spool as the valve element which slides in the valve sleeve in an axial direction;
the head-side port is located on one side in the axial direction relative to the rod-side port;
the tank-side port is located on the other side in the axial direction relative to the rod-side port; and
the spool comprises:
a large diameter portion having a diameter sliding relative to the valve sleeve and configured to close an entirety of the rod-side port,
a head-side small diameter portion which is located on the one side relative to the large diameter portion, has a smaller diameter than the large diameter portion, and is configured to make the rod-side port and the head-side port communicate by facing the two,
a tank-side small diameter portion which is located on the other side relative to the large diameter portion, has a smaller diameter than the large diameter portion, and is configured to make the rod-side port and the tank-side port communicate by facing the two.

5. The injection device according to claim 1, further comprising a check valve which is located between the head-side chamber and the servo valve in the run-around circuit, prohibits flow from the head-side chamber to the servo valve, and permits flow from the servo valve to the head-side chamber.

6. The injection device according to claim 1, further comprising:
an injection control part configured to control the servo valve to have the first state at least during a period of a low-speed injection process and a high-speed injection process; and
a pressure increase control part configured to control the servo valve to have the second state at least during a period of a pressure increasing process.

7. The injection device according to claim 1, comprising:
a liquid pressure supply part including a liquid pressure source; and
a pressure holding control part configured to control the liquid pressure supply part to temporarily give liquid pressure from the liquid pressure source to the rod-side chamber during a period of a pressure holding process.

8. The injection device according to claim 1, comprising:
an accumulator;
an accumulator-use valve configured to control flow of the hydraulic fluid from the accumulator to the head-side chamber;
a liquid pressure supply part including a liquid pressure source; and
a pressure holding control part configured to control the accumulator-use valve so that liquid pressure is continuously imparted from the accumulator to the head-side chamber during a period of a pressure holding process and control the liquid pressure supply part to temporarily give liquid pressure from the liquid pressure source to the head-side chamber during the period of the pressure holding process.

9. The injection device according to claim 1, comprising:
an accumulator;
an accumulator-use valve configured to control flow of the hydraulic fluid from the accumulator to the head-side chamber;
a liquid pressure supply part including the liquid pressure source;
a pressure increasing control part configured to control the accumulator-use valve so that the liquid pressure is imparted from the accumulator to the head-side chamber during a period of a pressure increasing process; and a pressure holding control part configured to control the liquid pressure supply part so that the liquid pressure is continuously imparted from the liquid pressure source to the head-side chamber at least after a predetermined point of time in a period of a pressure holding process.

10. The injection device according to claim 7, further comprising a preparation control part configured to control the liquid pressure supply part so that liquid pressure is imparted from the liquid pressure source to the rod-side chamber before a start of injection to thereby make a pressure in the rod-side chamber at a time of the start of injection higher than a pressure in the tank.

11. A molding machine comprising:
an injection device according to claim 1;
a clamping device configured to clamp the mold; and
an ejection device configured to eject a molding product from the mold.

* * * * *